(12) United States Patent
Cunningham et al.

(10) Patent No.: US 12,717,777 B2
(45) **Date of Patent: *Aug. 25, 2026**

(54) SYSTEM AND METHOD FOR NATURAL LANGUAGE QUERY PROCESSING AND VISUALIZATION

(71) Applicant: Technologies IP, LLC, Fort Worth, TX (US)

(72) Inventors: Aaron C. Cunningham, Celina, TX (US); Ronald Raymond Austring, English Harbour (AG); Louis A. Martinez, Fort Worth, TX (US); John B. Wheeler, Rockwall, TX (US)

(73) Assignee: Technologies IP, LLC

( * ) Notice: Subject to any disclaimer, the term of this patent is extended or adjusted under 35 U.S.C. 154(b) by 0 days.

This patent is subject to a terminal disclaimer.

(21) Appl. No.: 19/241,144

(22) Filed: Jun. 17, 2025

(65) Prior Publication Data

US 2025/0315427 A1 Oct. 9, 2025

Related U.S. Application Data

(63) Continuation of application No. 18/322,364, filed on May 23, 2023, now Pat. No. 12,332,876.

(51) Int. Cl.
*G06F 16/242* (2019.01)
*G06F 16/248* (2019.01)

(52) U.S. Cl.
CPC ...... *G06F 16/2423* (2019.01); *G06F 16/2425* (2019.01); *G06F 16/243* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 2022/0050840 | A1 | 2/2022 | Parravicini et al. |
| 2024/0135103 | A1 | 4/2024 | Dernoncourt et al. |
| 2024/0345551 | A1 | 10/2024 | Ramanasankaran et al. |

*Primary Examiner* — Eddy Cheung
(74) *Attorney, Agent, or Firm* — Enrigue Sanchez, Jr.; Juan J Vasquez

(57) ABSTRACT

Systems and methods for natural language query processing and visualization. In embodiments, a structure associated with a dataset and a natural language question are obtained and provided to an AI model to request, from the AI model, a query that may be used for retrieving data from the dataset responsive to the natural language question. The query is received form the AI model and executed against the data in the dataset to retrieve data responsive to the natural language question. In embodiments, the data responsive to the natural language question is analyzed to determine one or more structural characteristics of the data responsive to the natural language question, and a graphical visualization of the data responsive to the natural language question is generated based on the one or more structural characteristics of the data responsive to the natural language question.

20 Claims, 9 Drawing Sheets

SYSTEM AND METHOD FOR NATURAL LANGUAGE QUERY PROCESSING AND VISUALIZATION

CROSS-REFERENCE TO RELATED APPLICATIONS

The present application is a Continuation of U.S. patent application Ser. No. 18/322,364, filed May 23, 2022, entitled "SYSTEM AND METHOD FOR NATURAL LANGUAGE QUERY PROCESSING AND VISUALIZATION," the contents of which is incorporated herein in their entireties for all purposes.

TECHNICAL FIELD

The present disclosure relates generally to database query processing, and more specifically to a system and method for natural language query processing and visualization.

BACKGROUND

Knowledge is power. This has always been, and will probably always be true. In today's world, this might seem especially relevant, as in almost any facet of life, vast amounts of data are generated and stored. These vast amounts of data can provide a wealth of information that can be very useful to users. However, the utility of data may be lessened by the limitations of current analysis tools. For example, given the enormous amounts of data that is generated, analyzing the data can be a daunting task. In cases where particular information is desired, finding the particular information can be harder than finding the proverbial needle in a haystack. Current tools may facilitate searching for information by providing a mechanism to search through the data, but these current tools are often not robust enough.

For example, current systems may provide a search mechanism that employ syntax requirements that may be too rigid or strict, and which may dissuade or prevent users from maximizing utility because these systems may be difficult to use. These lack of flexibility may present a problem when trying to identify information from a dataset. Moreover, even when a query is successfully executed and data from the dataset is returned, these systems often lack a mechanism for revising the data results when the data results are not accurate.

In some cases, even when data can be obtained related to a query, understanding the relevance or meaning of the information provided by the data may be difficult using current systems. For example, a user may query a dataset to obtain data related to the top selling products. The query may return data related to the top selling products, but understanding the relevance of the returned data may be difficult as it may be provided in a format that may not be easy to understand. Current systems lack mechanisms for facilitating understanding of data returned by a query.

SUMMARY

The present disclosure achieves technical advantages as a system and method for natural language query processing and visualization of data. The present disclosure provides for a system integrated into a practical application with meaningful limitations as a system with functionality for allowing a user to input a natural language question (e.g., a plain-text query or inquiry, a plain-text instruction, etc.) related to data in a dataset in a conversational manner, and to receive, in response to the natural language question, results including data responsive to the natural language question and/or a customizable graphical visualization of the data responsive to the natural language question. In this manner, the user may not only receive data responsive to the natural language question, but may also receive a visualization that may facilitate the user's understanding of the data responsive to the natural language question and may provide a visualization of what the data responsive to the natural language question may convey.

In particular embodiments, a system may obtain a structure associated with a dataset and may receive a natural language question related to data in the dataset. The system may provide the structure associated with the dataset and the natural language question to an AI model and may request, from the AI model, a query that may be used for retrieving data from the dataset responsive to the natural language question. The system may receive the query from the AI model and may execute the query against the data in the dataset to retrieve data from the dataset responsive to the natural language question. The system may analyze the data responsive to the natural language question to determine one or more structural characteristics of the data responsive to the natural language question, and may generate, based on the one or more structural characteristics of the data responsive to the natural language question, a graphical visualization of the data responsive to the natural language question. In embodiments, the process may be iterative to dynamically revise and/or refine the query provided by the AI model and may include providing additional information, or requested information, to the AI model related to the structure of the dataset and/or exceptions associated with the query (e.g., syntax errors, inaccurate results, etc.). The advantageous result is that a user may perform queries related to the data in the dataset in a conversational manner, and may receive not only responsive data, but a visualization of the responsive data providing an enhanced result that improves the utilization of the data in the dataset.

Thus, it will be appreciated that the technological solutions provided herein, and missing from conventional systems, are more than a mere application of a manual process to a computerized environment, but rather include functionality to implement a technical process to replace or supplement current manual solutions or non-existing solutions for natural language query processing and visualization. In doing so, the present disclosure goes well beyond a mere application of a manual process in a computer environment. Accordingly, the claims herein necessarily provide a technological solution that overcomes a technological problem.

It is an object of the disclosure to provide a natural language query processing and visualization system. It is a further object of the disclosure to provide a method of processing and visualizing natural language queries and computer-based tool for natural language query processing and visualization. These and other objects are provided by the present disclosure, including at least the following embodiments.

In one particular embodiment, a natural language query processing and visualization system is provided. The system comprises at least one processor and a memory operably coupled to the at least one processor and storing processor-readable code that, when executed by the at least one processor, is configured to perform operations. The operations include obtaining a structure associated with a dataset, receiving a natural language question related to data in the dataset, providing the structure associated with the dataset and the natural language question to an AI model to request, from the AI model, a query for retrieving data from the dataset responsive to the natural language question, executing the query against the data in the dataset to retrieve data from the dataset responsive to the natural language question, analyzing the data responsive to the natural language question to determine one or more structural characteristics of the data responsive to the natural language question, and generating, based on the one or more structural characteristics of the data responsive to the natural language question, a graphical visualization of the data responsive to the natural language question.

In another embodiment a method of processing and visualizing natural language queries is provided. The method includes obtaining a structure associated with a dataset, receiving a natural language question related to data in the dataset, providing the structure associated with the dataset and the natural language question to an AI model to request, from the AI model, a query for retrieving data from the dataset responsive to the natural language question, executing the query against the data in the dataset to retrieve data from the dataset responsive to the natural language question, analyzing the data responsive to the natural language question to determine one or more structural characteristics of the data responsive to the natural language question, and generating, based on the one or more structural characteristics of the data responsive to the natural language question, a graphical visualization of the data responsive to the natural language question.

In yet another embodiment, a computer-based tool for natural language query processing and visualization is provided. The computer-based tool including non-transitory computer readable media having stored thereon computer code which, when executed by a processor, causes a computing device to perform operations. The operations include obtaining a structure associated with a dataset, receiving a natural language question related to data in the dataset, providing the structure associated with the dataset and the natural language question to an AI model to request, from the AI model, a query for retrieving data from the dataset responsive to the natural language question, executing the query against the data in the dataset to retrieve data from the dataset responsive to the natural language question, analyzing the data responsive to the natural language question to determine one or more structural characteristics of the data responsive to the natural language question, and generating, based on the one or more structural characteristics of the data responsive to the natural language question, a graphical visualization of the data responsive to the natural language question.

BRIEF DESCRIPTION OF THE DRAWINGS

For a more complete understanding of the present invention, reference is now made to the following descriptions taken in conjunction with the accompanying drawings, in which.

Figure 1:
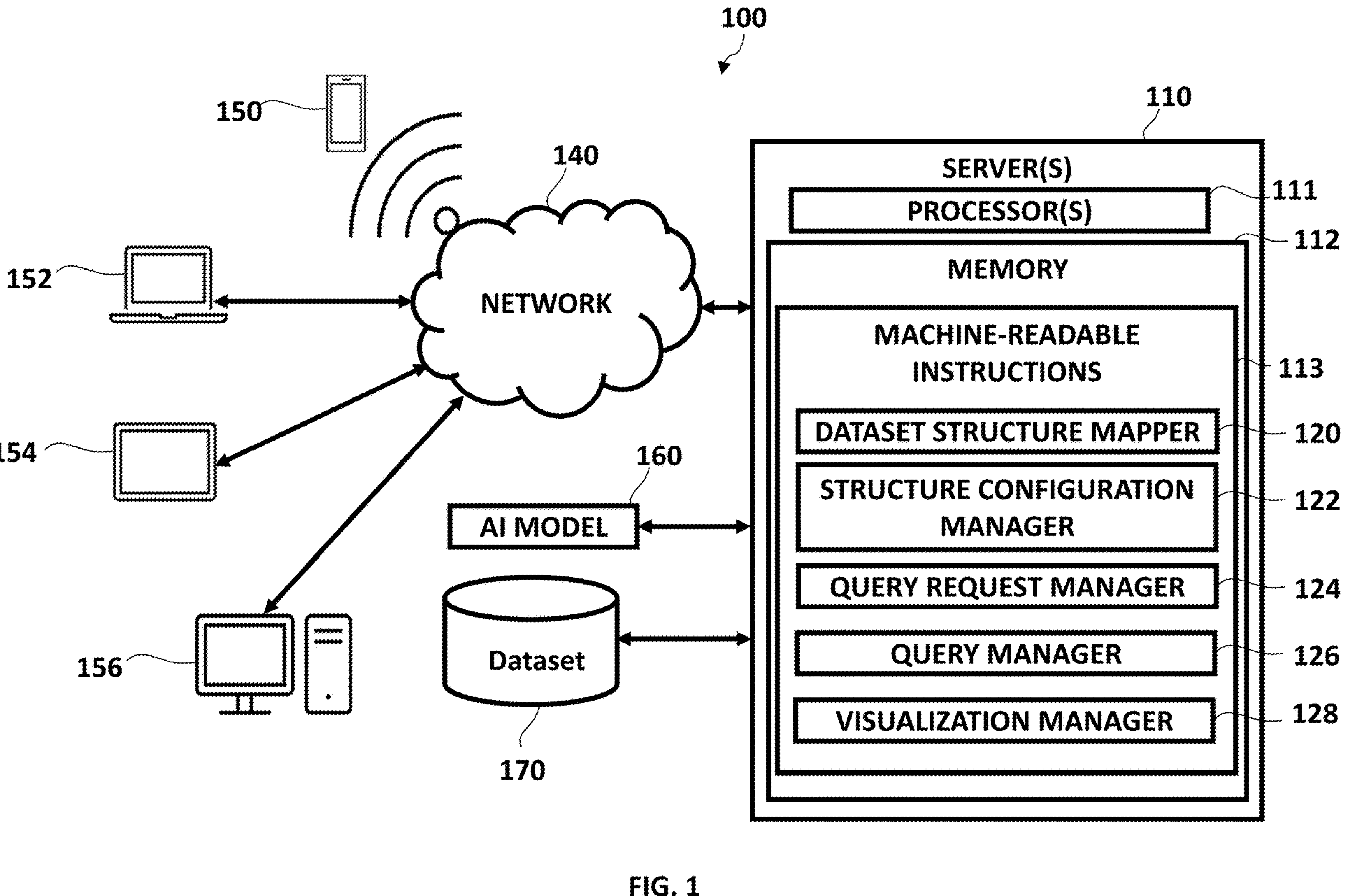
FIG. 1 is a block diagram of an exemplary system configured with capabilities and functionality for processing and visualizing natural language queries in accordance with one or more exemplary embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to systems and techniques that provide functionality for natural language query processing and visualization of data. In embodiments, the functionality provided by the features described herein may allow a user to input a natural language question (e.g., a plain-text query or inquiry, a plain-text instruction, etc.) related to data in a dataset in a conversational manner, and to receive, in response to the natural language question, results including data responsive to the natural language question and/or a customizable graphical visualization of the data responsive to the natural language question. For example, in particular embodiments, a structure associated with a dataset may be obtained and a natural language question related to data in the dataset may be received. The structure associated with a dataset and the natural language question related to data in the dataset may be provided to an AI model to request, from the AI model, a query that may be used for retrieving data from the dataset responsive to the natural language question. The query may be received from the AI model and may be executed against the data in the dataset to retrieve data responsive to the natural language question. In embodiments, the data responsive to the natural language question may be analyzed to determine one or more structural characteristics of the data responsive to the natural language question, and a graphical visualization of the data responsive to the natural language question may be generated based on the one or more structural characteristics of the data responsive to the natural language question.

FIG. 1 is a block diagram of an exemplary system 100 configured with capabilities and functionality for processing and visualizing natural language queries in accordance with one or more exemplary embodiments of the present disclosure. As shown in FIG. 1, system 100 may include one or more servers 110, dataset 170, and artificial intelligence (AI) model 160, among other relevant modules. In embodiments, server 110 may be operably coupled to one or more clients via a network 140. In embodiments, the clients may include a physical device (e.g., mobile phone 150, laptop 152, tablet 154, desktop computer 156, wearable device, or other suitable device), program, or application. In another exemplary embodiment, the clients can include a mobile phone 150 having a mobile application configured to communicate with server 110 over the network 140. Server 10 may be operably coupled to AI model 160 directly and/or via network 140.

The components of system 100 as illustrated in FIG. 1, and their individual components, may cooperatively operate to provide functionality in accordance with the discussion herein. For example, in operation according to embodiments, information related to dataset 170 may be received by server 110. Server 110 may obtain a structure associated with dataset 170. A user (e.g., using one of the clients) may input a natural language question. Server 110 may provide the structure associated with dataset 170 and the natural language question input by the user to AI model 160, and may request, from the AI model, a query that may be used for retrieving data from the dataset responsive to the natural language question based on the provided structure associated with dataset 170. Server 110 may receive the query from AI model 160 and may execute the query against the data in dataset 170 to retrieve data responsive to the natural language question input by the user. Server 110 may analyze the data responsive to the natural language question to determine one or more structural characteristics of the data responsive to the natural language question, and may generate, based on the one or more structural characteristics of the data responsive to the natural language question, a graphical visualization of the data responsive to the natural language question. The data responsive to the natural language question and/or the graphical visualization may be presented to the user (e.g., via one or more of the clients).

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 140.

In embodiments, network 140 may be the Internet, intranet, and/or other suitable network. The data transmission via network 140 may be encrypted, unencrypted, over a VPN tunnel, or other suitable communication means. Network 145 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc. In embodiments, network communication between the clients, server 110, or any other system component of system 100 may be encrypted using PGP, Blowfish, Twofish, AES, 3DES, HTTPS, and/or other suitable encryption. System 100 may be configured to provide communication via the various systems, components, and modules disclosed herein via an application programming interface (API), PCI, PCI-Express, ANSI-X12, Ethernet, Wi-Fi, Bluetooth, or other suitable communication protocol or medium. Additionally, third party systems and databases may be operably coupled to the system components via the network 140.

The data transmitted to and from the components of system 100 (e.g., server 110 and clients), may include any format, including JavaScript Object Notation (JSON), TCP/IP, XML, HTML, ASCII, SMS, CSV, representational state transfer (REST), or other suitable format. The data transmission may include a message, flag, header, header properties, metadata, and/or a body, or be encapsulated and packetized by any suitable format having same.

Dataset 170 may include, or may be part of, a database configured to store structured data. Dataset may represent a database, and/or multiple databases distributed over multiple resources. In embodiments, the data in dataset 170 may relate to a particular sector, field, area, industry, business, trade, etc., and may include different types of data. In some embodiments, dataset 170 may include a plurality of tables that may be modeled in rows and columns. In these embodiments, each of the rows of a table may represent a database record, and each column of a table may represent an attribute of the data in dataset 170. In some embodiments, each record in dataset 170 may include a key that may be used to establish relationships between different data points of dataset 170. In this manner, dataset 170 may be considered a relational database. The relationships between data points of dataset 170 may provide a mechanism for efficiently retrieving data from dataset 170. In some embodiments, querying, manipulating, modifying, defining, accessing, etc. the data in dataset 170 may involve using a query language such as structured query language (SQL).

In embodiments, dataset 170 may be implemented using one of various database management systems or platforms. The database management system may be used to create, access, and/or manage dataset 170, and may include mechanisms for populating data into dataset 170 and/or modifying the data in dataset 170, as well as the structure of dataset 170. For example, dataset 170 may be implemented using a database management system such as Snowflake, MySQL, Microsoft SQL, Postgres, .MODB, Oracle, Cosmos, Bigtable, etc. In some embodiments, the structure of dataset 170 may depend on the database management system used.

In embodiments, the structure of dataset 170 may include the data structure such as defined by the tables in dataset 170 (e.g., including the rows and columns of the tables), the relationships that have been defined between the various tables, keys defined for associating different tables, etc., and/or database configuration structure such as permission information (e.g., specifying properties that may be queried by particular users, etc.).

AI model 160 may represent one or more AI-based models configured to generate results based on in input data. In particular embodiments, AI model 160 may include a generative AI model that may be configured to process language and to generate content based on language-based input data and query parameters. For example, in some embodiments, AI model 160 may include a large language model, such as a generative pre-trained transformer (GPT) language-based model. In some embodiments, AI model 160 may include language-based models other than GPT models.

In embodiments, AI model 160 may be part of a component that may be separate from server 110. For example, in some embodiments, AI model 160 may be part of a different server from server 110. In these embodiments, server 110 may be communicatively coupled with AI model 160 via network 140. In embodiments, AI model 160 may be part of server 110 (e.g., may be part of server 110's hardware and/or software functionality).

In embodiments, AI model 160 may be trained to "understand" database languages (e.g., SQL) and database structures. In these embodiments, AI model 160 may be configured to, based on a dataset structure (e.g., the structure of the dataset tables, the columns, order of the items and/or records, etc.), analyze a natural language question (e.g., a plain-language or plain-text inquiry or instruction) that may not be formatted in database language, and to generate one or more database language (e.g., SQL) statements that may be executed as a query against the dataset to obtain data responsive to the natural language question. For example, AI model 160 may be configured to receive (e.g., from server 110) a structure associated with a dataset (e.g., the structure of dataset 170) and a natural language question (e.g., a plain text inquiry, instructions, etc.) and to generate a query (e.g., a query in a database language (e.g., SQL) syntax) that may be executed against the dataset to retrieve information responsive to the natural language question. In embodiments, AI model 160 may be configured to determine whether the structure associated with the dataset and the natural language question received from server 110 are sufficiently defined for AI model 160 to generate the query (e.g., to generate the query such that the query may be used to retrieve information responsive to the natural language question) or whether additional information is needed by AI model 160 to generate the query. In embodiments, in response to a determination that additional information is needed by AI model 160 to generate the query, AI model 160 may provide server 110 with requests (e.g., natural language inquiries or instructions) for the additional information.

Server 110 may be configured to facilitate operations for processing and visualizing natural language queries in accordance with embodiments of the present disclosure. In embodiments, functionality of server 110 may be provided by the cooperative operation of the various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single and separate blocks, each of the various components of server 110 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of server 110 may actually be part of a different component of server 110, and as such, the description of the particular functionality described for the particular component of server 110 is for illustrative purposes and not limiting in any way.

As shown in FIG. 1, server 110 includes processor 111, memory 112, machine readable instructions 113, dataset structure mapper 120, structure configuration manager 122, query request manager 124, query manager 126, and visualization manager 128. In embodiments, server 110 may be implemented in hardware, software, or a suitable combination of hardware and software therefor, and may comprise one or more software systems operating on one or more servers, having one or more processors 111, with access to memory 112. Server 110 may include electronic storage, one or more processors, and/or other components. Server 110 may include communication lines, connections, and/or ports to enable the exchange of information via a network 140 and/or other computing platforms. Server 110 may also include a plurality of hardware, software, and/or firmware components operating together to provide the functionality attributed herein to server 110. For example, server 110 may be implemented by a cloud of computing platforms operating together as server 110, including Software-as-a-Service (SaaS) and Platform-as-a-Service (PaaS) functionality.

Memory 112 may comprise electronic storage that may include non-transitory storage media that electronically stores information. For example, memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices In embodiments, the electronic storage media of electronic storage may include one or both of system storage that may be provided integrally (e.g., substantially non-removable) with server 110 and/or removable storage that may be removably connectable to server 110 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage may include a database, or public or private distributed ledger (e.g., blockchain). The electronic storage may store machine-readable instructions 106, software algorithms, control logic, data generated by processor(s), data received from server(s), data received from computing platform(s), and/or other data that can enable server(s) to function as described herein. The electronic storage may also include third-party databases accessible via the network 140.

Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions (e.g., machine-readable instructions 113) to perform operations in accordance with the disclosure herein. In some embodiments, implementations of processor 111 may comprise code segments (e.g., software, firmware, and/or hardware logic) executable in hardware, such as a processor, to perform the tasks and functions described herein. In yet other embodiments, processor 111 may be implemented as a combination of hardware and software. Processor 111 may be communicatively coupled to memory 112.

In embodiments, machine-readable instructions 106 may represent a single networked node, or a machine cluster, which may include a distributed architecture of a plurality of networked nodes. Machine-readable instructions 106 may include control logic for implementing various functionality, as described in more detail below. Machine-readable instructions 106 may include certain functionality associated with the natural language query processing and visualization system 100. Additionally, machine-readable instructions 106 may include a smart contract or multi-signature contract that can process, read, and write data to the database, distributed ledger, or blockchain.

Dataset structure mapper 120 may be configured to obtain or retrieve a structure associated with dataset 170. For example, dataset structure mapper 108 may be configured to obtain information for connecting to dataset 170, establish a connection with dataset 170, and, using the connection to dataset 170, obtain the structure of dataset 170.

In embodiments, information for connecting to dataset 170 may be obtained from a user of system 100. For example, a user may register and log in to system 100 (e.g., to use the functionality of server 110 via one or more of the clients) as user associated with dataset 170. The user may provide information related to a connection to database 170 and/or a particular way to interface with database 170. In embodiments, obtaining the information for connecting to dataset 170 may include a manual process and/or a guided process.

In embodiments, the manual process for obtaining information for connecting to dataset 170 may include the user providing a connection string configured to enable a connection to dataset 170. For example, in some embodiments, the user may access an interface to the database management system used to implement and/or manage dataset 170. In this case, the user may cause a connection string for connecting to dataset 170 to be generated by the database management system, which may include connection information. The user may retrieve the connection string and may provide the connection string to dataset structure mapper 120. The following are examples of connection strings that may be used in a manual process for obtaining information for connecting to dataset 170 provided for illustrative purposes and not by way of limitation.

1) UserID=root;Password=myPassword;Host=localhost; Port=5432;Database=myDataBase; Pooling=false;
2) Server=myServerAddress;Port=1234; Database=myDataBase;Uid=myUsername;Pwd=m yPassword;
3) Server=myServerName,myPortNumber; Database=myDataBase;UserId=myUsername;Pa ssword=myPassword;

In embodiments, dataset structure mapper 120 may use the connection string to connect to dataset 170 to obtain, retrieve, or determine the structure of the data in dataset 170 (e.g., the structure associated with dataset 170). For example, in embodiments, dataset structure mapper 120 may execute a data connector interface to connect to dataset 170 using the connection string.

In embodiments, the guided process for obtaining information for connecting to dataset 170 may include prompting the user to provide information for establishing a connection to dataset 170. For example, the user may be prompted to select a database type, to provide a database name, a user ID, a password, a host address, and/or any other information determined to be required for connecting to dataset 170. In this case, dataset structure mapper 120 may use the information provided by the user in response to the prompts to connect to dataset 170 to obtain, retrieve, or determine the structure of the data in dataset 170 (e.g., the structure associated with dataset 170).

Once connected to dataset 170, dataset structure mapper 120 may perform a scan of dataset 170 to determine the structure of dataset 170. In embodiments, the scan may include scanning to determine the structure of the tables in dataset 170 and scanning to determine relationships between the tables. For example, in embodiments, dataset structure mapper 120 may execute one or more predefined queries against dataset 170 to obtain details of the structure of the data in dataset 170. In embodiments, the one or more predefined queries executed against dataset 170 to obtain details of the structure of the data in dataset 170 may include queries requesting dataset 170 to provide details about itself, such as details on what tables exist in dataset 170, the structure of the tables (e.g., the rows and column details of one or more of the tables), details on what type of data may be stored in each of the tables, names of the tables in dataset 170, names of the columns, rows, etc. in the tables, etc. In embodiments, the one or more predefined queries executed against dataset 170 to obtain details of the structure of the data in dataset 170 may include queries requesting dataset 170 to provide details about how the various tables in dataset 170 relate to each other, details on keys associated with each table, details on properties associated with one or more of the tables in dataset 170, etc.

The following illustrates an example of a predefined query executed against dataset 170 to obtain details of the structure of the data in dataset 170 provided for illustrative purposes and not by way of limitation:

```
select
   t.table_name as table,
   array_agg(c.column_name::text) as columns
from
   information_schema.tables t
inner join information_schema.columns c on
   t.table_name = c.table_name
where
   t.table_schema = 'public'
   and t.table_type= 'BASE TABLE'
   and c.table_schema = 'public'
group by t.table_name
```

It is noted that the specific structure details discussed herein with respect to the structure of dataset 170 is provide for illustrative purposes and should not be construed as limiting in any way. Indeed, in embodiments, the structure of dataset 170 may also or alternative include other types of details that may not be explicitly described herein but may be useful for determining how the data in dataset 170 is structured, and any relationships between the various data points.

It is noted that during scanning of dataset 170 by dataset structure mapper 120 to determine the structure of dataset 170, no actual data (e.g., data records) is retrieved from dataset 160, but rather at this stage, the structure of dataset 170 includes details and/or information related to the structure of the data, not the actual contents of the data.

Structure configuration manager 122 may be configured to validate, refine, and/or optimize the structure associated with dataset 170 obtained by dataset structure mapper 120. In embodiments, structure configuration manager 122 may be configured to optimize the structure associated with dataset 170 to increase and/or maximize the likelihood that a query generated by AI model 160, based, at least in part, on the structure associated with dataset 170, may yield accurate results (e.g., yields results accurately responsive to a natural language question). In embodiments, optimizing the structure associated with dataset 170 may include an iterative process in which, at each iteration, the structure associated with dataset 170 may be refined or revised accordingly to increase the likelihood that the query generated by AI model 160 may be accurately responsive to a natural language question.

For example, in embodiments, structure configuration manager 122 may make the current iteration of the structure associated with dataset 170 (e.g., the structure associated with dataset 170 obtained by dataset structure mapper 120 and/or a previously revised the structure associated with dataset 170) available to the user for inspection. In this case, the current iteration of the structure associated with dataset 170 may be presented (e.g., via a graphical interface using one or more of the clients) to the user. The user may inspect the current iteration of the structure associated with dataset 170 and may determine whether additional structure data may be needed to increase the likelihood that the query generated by AI model 160 may be accurately responsive to a natural language question. For example, the user may determine that the current iteration of the structure associated with dataset 170 may include particular intricacies and/or idiosyncrasies that may have to be further defined by the user to the AI model 160 (e.g., that may have to be explained by the user to the AI model, such as using the techniques described in the following).

In embodiments, optimizing the structure associated with dataset 170 may include enabling the user to provide one or more natural language (e.g., plain-text) details associated with the structure associated with dataset 170, clarifying one or more details of the structure associated with dataset 170, that may be included with the structure associated with dataset 170. In embodiments, the user may identify and define identify important data elements, and may define an association between the data elements and columns in dataset 170 interactively. For example, the following illustrates examples of natural language statements that the user may provide to optimize the structure associated with dataset 170 provided for illustrative purposes and not by way of limitation:

1) "A customer is a person in the person table with a typeId=4."
2) "Only active items should be included in result sets."
3) "Orders_2 is the correct table to find orders in. Ignore Orders and Orders_1."

In embodiments, optimizing the structure associated with dataset 170 may include engaging with AI model 160 to determine whether a current iteration of the structure associated with dataset 170 is sufficiently defined for AI model 160 to generate the query for retrieving data responsive to natural language questions or whether additional information is needed by AI model 160 to generate the query. For example, in embodiments, the current iteration of the structure associated with dataset 170 may be provided to AI model 160, and AI model 160 may be questioned as to whether, based on the current iteration of the structure associated with dataset 170, AI model 160 may be able to generate a query for retrieving information from dataset 170 responsive to natural language questions related to the data in dataset 170. It is noted that at this point, a particular natural language question may not yet have been received from a user, but the AI model 160 may be questioned as to whether the current iteration of the structure associated with dataset 170 is sufficiently defined for AI model 160 to potentially provide a query for any natural language question. Alternatively, or additionally, AI model 160 may analyze the current iteration of the structure associated with dataset 170 to determine whether AI model may identify deficiencies that may prevent AI model 160 from generating a query to retrieve data responsive to a natural language question.

In embodiments, in response to AI model 160 determining that the current iteration of the structure associated with dataset 170 is not sufficiently defined for AI model 160 to provide a query for retrieving data response to a natural language question, AI model 160 may generate questions configured to obtain additional information for sufficiently defining the structure associated with dataset 170 for AI model 160 to provide a query for retrieving data response to a natural language question. The questions generated by AI model 160 may be provided to structure configuration manager 122. In embodiments, structure configuration manager 122 may present the questions generated by AI model 160 to the user, and may prompt to the user to provide the additional information. In embodiments, the questions generated by AI model 160 may be in a conversational, natural language format. For example, in a specific example, AI model 160 may determine that the current iteration of the structure associated with dataset 170 is not sufficiently defined, as a relationship between a first table (e.g., a table defining a "person") and a second table (e.g., a table defining a "patient") is not well defined because a unified key between the first and second table is not present. In this case, AI model 160 may generate questions and structure configuration manager 122 may present the questions to the user as follows:

"The structure of the dataset has been analyzed, and there are questions that would help us understand the structure better. There is a table defining a person and a table defining a patient. In the dataset, how does a person relate to a patient?"

The user may provide answers to the questions, conversationally, such as by answering the questions in the prompt, and structure configuration manager 122 may include the additional information provided in the answers from the user with the structure associated with dataset 170 as a next iteration of the structure associated with dataset 170. The next iteration of the structure associated with dataset 170 may be provided to AI model 160 to determine whether the next iteration of the structure associated with dataset 170 is sufficiently defined for AI model 160 to provide a query for retrieving data response to a natural language question.

AI model 160 may determine that the next iteration of the structure associated with dataset 170 is still not sufficiently defined for AI model 160 to provide a query for retrieving data response to a natural language question, in which case AI model may generate further questions for obtaining further additional information for sufficiently defining the structure associated with dataset 170 for AI model 160. The additional questions may be presented to the user to obtain the further additional information. In this case, the iterative process continues until AI model 160 determines that a present iteration of the structure associated with dataset 170 is sufficiently defined for AI model 160 to provide a query for retrieving data response to a natural language question.

On the other hand, AI model 160 may determine that the next iteration of the structure associated with dataset 170 is sufficiently defined for AI model 160 to provide a query for retrieving data response to a natural language question, in which case the next iteration of the structure associated with dataset 170 may be provided to structure configuration manager 122 as a finalized structure associated with dataset 170.

In embodiments, the optimized structure associated with dataset 170 may be provided by structure configuration manager 122 as a finalized structure associated with dataset 170. In some embodiments, the questions and/answers exchanged between the user and AI model 160 may be used to further train AI model 160. As the questions and/answers exchanged between the user and AI model 160 may include information on the data structure of dataset 170 and additional configuration details, such as metadata about that structure of dataset 170 and connections inside of dataset 170, AI model 160 may be able to use the training to, in the future, when AI model 160 determines additional information is needed, to attempt to answer the question using the training, rather than feedback the question to the user. In this manner, AI model 170 may be specifically trained for the dataset 170, and/or for the user, as the training may be based on the specific answers by the user for dataset 170. In some applications, each user client may have an AI model 170 specifically trained to the user client's database structure and/or additional configuration details. In these applications, structure configuration manager 122, with knowledge or configuration that a particular query approach may be used by a user, may provide AI model 160 with additional data that may be specific to the user as configuration data upfront.

In embodiments, the optimized structure associated with dataset 170 may be provided by structure configuration manager 122 as a finalized structure associated with dataset 170.

Query request manager 124 may be configured to generate a request for a query from AI model 160. In embodiments, the request for a query generated by query request manager 124 may be a request for a query for retrieving data from dataset 170 responsive to a natural language question received from a user. For example, in embodiments, query request manager 124 may be configured to receive a user input including the natural language question. In embodiments, the natural language question may include a plain-text query or inquiry, a plain-text instruction, etc. related to the data in dataset 170. In embodiments, the natural language question may be entered by the user (and/or received by query request manager 124) in a conversational manner. For example, in a particular example provided for illustrative purposes, query request manager 124 may provide (e.g., via a graphical interface presented to the user using one or more of the clients) a mechanism for the user to enter the natural language question in a conversational manner. In this example, dataset 170 may be associated with a healthcare application, and the user may enter the following natural language question: "Display the top 3 chains, and the count of the claims associated with each chain." As can be seen, in this example, the natural language question entered by the user includes plain-text instructions to display the top three chains and the claim count associated with each chain based on the data stored in dataset 170. In this example, query request manager 124 may receive the user entered instructions as the natural language question.

In embodiments, query request manager 124 may be configured to request, from AI model 160, a query that may be executed against dataset 170 to retrieve data responsive to the natural language question from dataset 170. For example, following the example above, query request manager 124 may be configured to request, from AI model 160, a query that may be executed against dataset 170 to retrieve data indicating the top three chains and the count of the claims associated with each chain from dataset 170.

In embodiments, requesting, from AI model 160, a query that may be executed against dataset 170 to retrieve data responsive to the natural language question from dataset 170 may include providing to AI model 160 the finalized structure associated with dataset 170 (e.g., which may include the structure associated with dataset 170 and/or additional configuration data, such as configuration data provided by the user) and the natural language question. In this manner, query request manager 124 may request for AI model 160 to generate a database language query that may be executed to retrieve data that may be used to answer the natural language question asked by the user (e.g., input by the user). For example, following the example above where dataset 170 may be associated with a healthcare application in which the user may ask to display the top 3 chains and the count of the claims associated with each chain, query request manager 124 may provide the following to AI model 160 to request a query that may be executed against dataset 170 to retrieve data that may be used to display the top 3 chains and the count of the claims associated with each chain:

```
### DATABASE STRUCTURE: SQL tables, with their properties:
#
# chain(chainid, lastupdatedon, createdon, chainname)
#   claim(charges, claimstatus, transactiondate, dateofservice, pharmacistid, patientid,
pharmacyid, chainid, claimid, lastupdatedon, createdon, ndc)
# encounter(servicetype, encounterid, patientid, pharmacyid, claimid, encounterstartdate,
encounterenddate, createdon, lastupdatedon)
# patient(patientid, gender, dateofbirth, lastname, firstname, createdon, cardholderid, state,
lastupdatedon)
# patients(lastupdatedon, createdon, dateofbirth, patientid, lastname, firstname, state, gender)
#  pharmacist(lastname, pharmacistid, pharmacyid, firstname, pharmacistnpi, createdon,
lastupdatedon)
#  pharmacy(pharmacyid, chainid, pharmacyname, npi, state, storenumber, createdon,
lastupdatedon)
#
# ADDITIONAL CONFIGURATION DATA FROM USER: none
#
### NATURAL LANGUAGE QUESTION: Display the top 3 chains, and the count of the
claims associated with each chain.
```

In embodiments, AI model 160 may receive the finalized structure associated with dataset 170 and the natural language question from query request manager 124 and may generate the query based on the finalized structure associated with dataset 170 and the natural language question from query request manager 124. For example, in embodiments, AI model 160 may be configured to generate, based on the finalized structure associated with dataset 170 (e.g., which may include the structure associated with dataset 170 and/or additional configuration data, such as configuration data provided by the user) and the natural language question, a query that may be executed against dataset 170 to retrieve data responsive to the natural language question.

In embodiments, the query generated by AI model 160 may be a query in a database language syntax (e.g., SQL). For example, as noted above, AI model 160 may be trained to "understand" database languages (e.g., SQL), database structures, operations and functionality of various database management systems, etc. In this case, AI model 160 may be configured to, based on the finalized structure of dataset 170, analyze the natural language question, and generate one or more database language (e.g., SQL) statements that may be included as the query to be executed against dataset 170 to obtain data responsive to the natural language question.

In some embodiments, AI model 160 may be configured to further optimize the query generated based on knowledge by AI model 160 of various database management systems. For example, AI model 160 may know that in a first database management system, particular data types (e.g., timestamps, etc.) are handled differently than in a second database management system. In this case, AI model 160 may optimize the query by taking these differences into account when generating queries that may be executed in the first database management system or the second database management system. In some cases, AI model 160 may be aware of differences in built-in functions across different database management system and may take these differences into account. In some embodiments, AI model 160 may learn the differences based on the connection to dataset 160 (e.g., the connection established by dataset structure mapper 120.

In some embodiments, prior to generating the query that may be executed against dataset 170 to retrieve data responsive to the natural language question, AI model 160 may determine whether additional information may be required by AI model 160 to generate the query. For example, AI model 160 may analyze the finalized structure of dataset 170, may analyze answers to previous questions asked by AI model 160 (e.g., during optimization of the structure of dataset 170), may analyze additional configuration data provided by the user, and may analyze the natural language question to determine whether AI model 160 may be able to generate a valid database language query for retrieving data responsive to the natural language question based on the information. In response to a determination that AI model 160 is able to generate a valid database language query for retrieving data responsive to the natural language question based on the information provided in the above information, AI model 160 may generate the query.

On the other hand, in response to a determination that AI model 160 is not able to generate a valid database language query for retrieving data responsive to the natural language question based on the information provided in the above information, AI model 160 may determine that additional information may be needed to be able to generate the query. In this case, AI model may generate one or more questions configured to obtain the additional information needed to be able to generate the query. The questions generated by AI model 160 may be provided to query request manager 124. In embodiments, query request manager 124 may present the questions generated by AI model 160 to the user, and may prompt to the user to provide the additional information. In embodiments, the questions generated by AI model 160 may be in a conversational, natural language format. Answers to the questions generated by AI model 160 may provide the additional information needed by AI model 160 to be able to generate the query, which may be provided to AI model 160. AI model 160 may receive the additional information and may generate the query. For example, in a specific example provided for illustrative purpose and not by way of limitation, AI model 160 may determine that the request for the query from query request manager 124 includes a data element that does not exist in the structure of dataset 170. For example, the natural language question may be asking form information on a particular vaccine, but there is no data element related to a vaccine, and AI model 160, based on the provided structure of dataset 160 as well as the additional configuration information may not understand how to derive the data element for a vaccine. In this case, AI model 160 may generate a question asking, "where in the dataset can vaccines be found?" and the user may provide an answer to the question such as, "vaccines are located in the drug table." In this case, with the additional information, AI model 160 may generate a query for retrieving data responsive to the natural language question.

In embodiments, the query generated by AI model 160 may be provided to query manager 126. In embodiments, as noted above, the query that may be executed against dataset 170 to retrieve data responsive to the natural language question may be formatted in a database language syntax (e.g., SQL). For example, following the example above where dataset 170 may be associated with a healthcare application, the query generated by AI model 160 to retrieve data indicating the top three chains and the count of the claims associated with each chain from dataset 170 may be as follows:

```
SELECT chain.chainname, COUNT(claim.claimid) AS claimcount
FROM chain
INNER JOIN claim ON chain.chainid = claim.chainid
GROUP BY chain.chainname
ORDER BY claimcount DESC
LIMIT 3
```

Query manager 126 may be configured to validate the query generated by AI model 160 and to execute the validated query against dataset 170 to retrieve data responsive to the natural language question. In embodiments, validating a query generated by AI model 160 may include an iterative process in which, at each iteration, additional data may be provide (e.g., by the user), which AI model 160 may use to further refine the query to increase the likelihood that the query can be executed and can retrieve data accurately responsive to the natural language question.

In embodiments, validating the query generated by AI model 160 may include sanitizing the query. In embodiments, sanitizing the query may include ensuring that the query does not include commands that may cause, or may be likely to cause, undesired modifications to the structure or the data of dataset 170. For example, query manager 126 may analyze the query generated by AI model 160 to determine whether the query includes any alter or drop statements. Query manager 126 may determine that the query generated by AI model 160 does not include any unauthorized statements, in which case query manager 126 may determine that AI model is sanitized. On the other hand, query manager 126 may determine that the query generated by AI model 160 is not sanitized (and thus not valid) due to the presence of unauthorized statements. In this case, query manager 126 may notify AI model 160 that the query generated is not sanitized, and thus not valid, due to the presence of unauthorized statements, and may request that AI model 160 refine (e.g., re-generate) the query with consideration of the unauthorized statements. In this case, AI model 160 may sanitize the query by removing the unauthorized statements, such as by generating a new query without the unauthorized statements.

In embodiments, the functionality of query manager 126 to validate the query generated by AI model 160 may include determining whether execution of the query against dataset 170 generates any exceptions. In these embodiments, query manager 126 may execute the query against dataset 170 to determine whether the query can be executed or whether any exception occurs. In some cases, a bad syntax, an incorrect or bad join statement, a reference to a table, column, etc. that does not exist in dataset 170, etc. may cause an exception to occur. In this case, query manager 126 may request further input from the user. For example, query manager 126 may request that the user provide, based on the one or more exceptions cause by the query, further dataset structure details related to the cause of the exception to determine the reason for the exception. In this case, the user may analyze the exception and may determine further information related to the cause of the exception. This further information may be provided to query manager 126, which may provide the further information to AI model 160. In embodiments, AI model 160 may refine (e.g., re-generate) the query based on the further information to ensure that the refined query does not cause the same exception. In embodiments, if the refined query causes an exception, the same process may be followed to further refine the query until the query may be run against dataset 170 without exceptions.

In embodiments, the functionality of query manager 126 to validate the query generated by AI model 160 may include determining whether execution of the query against dataset 170 retrieves data that is accurately responsive to the natural language question. For example, in embodiments, query manager 126 may execute the query against dataset 170 and may provide a mechanism to present the data retrieved from dataset 170 in response to the execution of the query to the user. In a specific example, such as the example above where dataset 170 may be associated with a healthcare application and the natural language question asks to display the top three chains and the count of the claims associated with each chain, the data retrieved from dataset 170 in response to the execution of the query to answer the natural language question may be as follows:

{"chainname":"Skaboo,", "claimcount":"144"}
{"chainname":"Browsezoom,", "claimcount":"122"}
{"chainname":"Midel,", "claimcount":"116"}

In embodiments, query manager 126 may request input from the user indicating whether the data retrieved from dataset 170 in response to the execution of the query to the user accurately answers the natural language question. For example, in another specific example, the natural language question may ask for details about a doctor. In a case where the data retrieved from dataset 170 in response to the execution of the query provides data related to doctor details, it may be determined (e.g., by user input) that the data retrieved from dataset 170 in response to the execution of the query to the user accurately answers the natural language question. In this case, the query may be determined to be validated.

On the other hand, the data retrieved from dataset 170 in response to the execution of the query may provide data related to pharmacist details instead of doctor details. In this case, it may be determined (e.g., by user input) that the data retrieved from dataset 170 in response to the execution of the query to the user does not accurately answer the natural language question. In embodiments, the user may provide this indication of incorrectness by indicating that the data retrieved from dataset 170 is related to pharmacists, and that pharmacists are not doctors, which may be provided to AI model 160 and in this manner, AI model 160 may be further trained. In embodiments, in response to a determination that the data retrieved from dataset 170 in response to the execution of the query to the user does not accurately answer the natural language question, the further additional data provided by the user related to the incorrect data may be provided to AI model 160. AI model 160 may refine (e.g., re-generate) the query based on the further information provided by the user. The refined query may be executed and the data retrieved may be again verified for accuracy. If the data retrieved from the execution of the refined query does not accurately answer the natural language question, the same process may be followed to further refine the query until the data retrieved from the execution of the query accurately answers the natural language question.

In embodiments, query manager 126 may be configured to store the validated query in a database of system 100 (not shown), along with the natural language question and/or the data retrieved from the execution of the validated query. In some embodiment, connection details associated with dataset 170, structure of the dataset 170, additional configuration data provided by the user, questions generated by AI model 160, answers provided by the user in response to AI model 160's questions, and/or other information related to operations for processing natural language questions may be stored by query manager 126. In some embodiments, query manager 126 may store the validated query and the natural language question in a "most recent" result set. In some embodiments, if the connection to dataset 170 is associated with an organization, the validated query and/or the data retrieved from the execution of the validated query may be shared with other users of the organization.

Visualization manager 128 may be configured to generate a graphical visualization of the data responsive to the natural language question retrieved by the execution of the query provided by AI model 160 against dataset 170. In embodiments, the graphical visualization may present the data responsive to the natural language question in an analytical way to provide a visual conceptualization or idea of what the data responsive to the natural language question represents and may reveal patterns within the data. In embodiments, the graphical visualization may be generated based on the known structure associated with dataset 170, analysis of the natural language question, and/or analysis of the data responsive to the natural question. In this manner, the answer provided by system 100 to the user in response to a natural language question by the user may include more than just a presentation of the data responsive to the natural language question, but may also include a visualization of the data with respect to the natural language question that may facilitate putting the data responsive to the natural language question within one or more relevant contexts. For example, in some embodiments, the graphical visualization may provide a visual representation of how the data responsive to the natural language question relate to the overall dataset 170 and how the data points in the data responsive to the natural language question relate to each other. In embodiments, the graphical visualization may include charts, graphs, diagrams, maps, etc.

Figure 9:
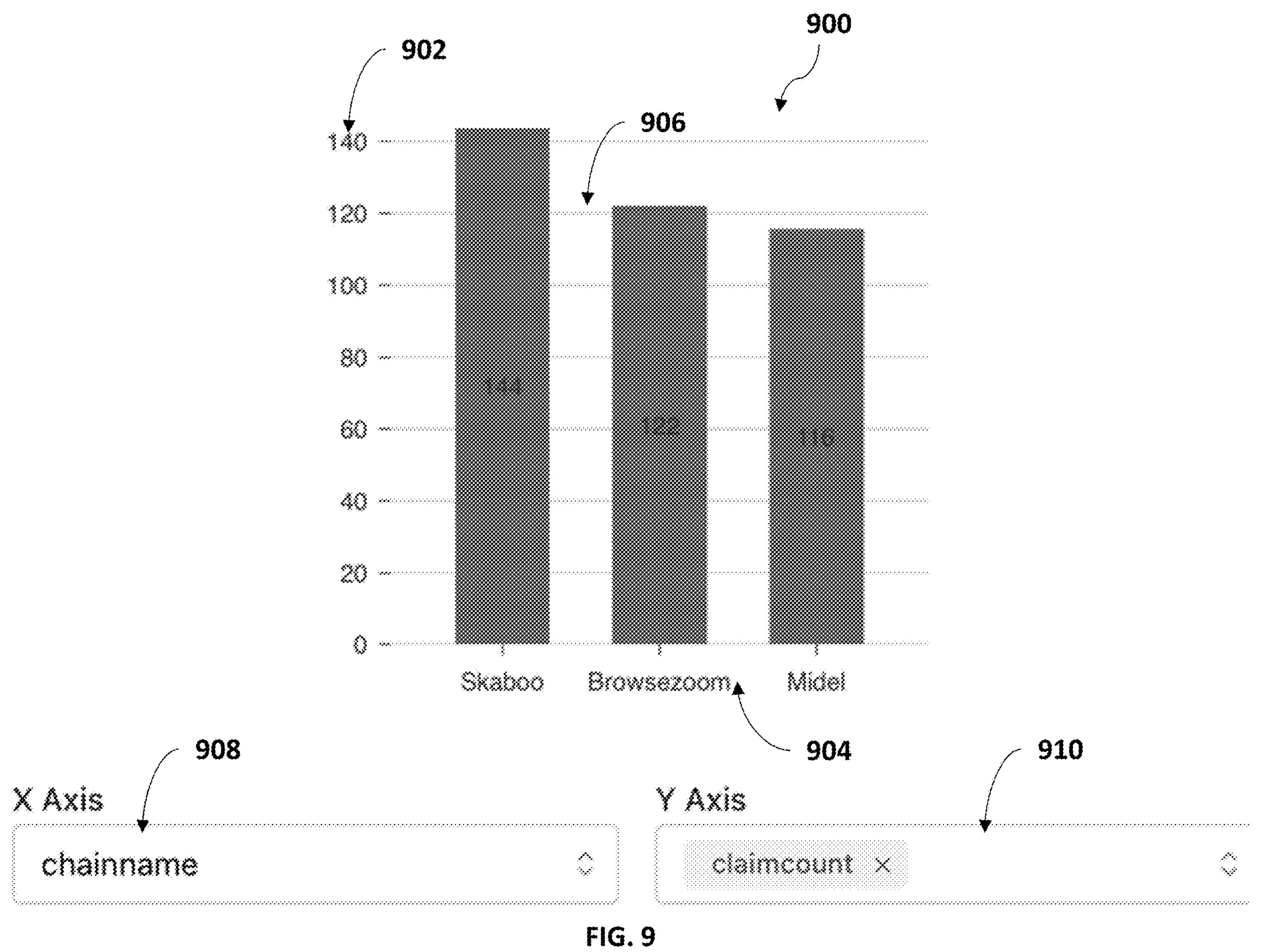
FIG. 9 shows an example of a graphical visualization of data responsive to a natural language question retrieved in response to execution of a query generated by an artificial intelligence (AI) model in accordance with embodiments of the present disclosure.

The functionality of visualization manager 128 to generate the graphical visualization of the data responsive to the natural language question will now continue to be described with additional reference to FIG. 9. FIG. 9 shows an example of a graphical visualization 900 of data responsive to a natural language question retrieved in response to execution of a query generated by an AI model in accordance with embodiments of the present disclosure.

The exemplary graphical visualization 900 shown in FIG. 9 is related to the example mentioned above in which dataset 170 may be associated with a healthcare application and the natural language question includes "Display the top 3 chains, and the count of the claims associated with each chain." In this case, the data retrieved from dataset 170 in response to the execution of the query generated by AI model 160 to answer the natural language question may include a responsive dataset as follows:

{"chainname":"Skaboo,", "claimcount": "144"}
{"chainname":"Browsezoom,", "claimcount": "122"}
{"chainname":"Midel,", "claimcount": "116"}

In this example, graphical visualization 900 may represent a visualization of the responsive dataset.

In embodiments, generating the graphical visualization of the data responsive to the natural language question (e.g., the responsive dataset) may include analyzing the data responsive to the natural language question to determine one or more structural characteristics of the data responsive to the natural language question, and/or analyzing the natural language question to determine key dimensions and/or measures in the natural language question. Based on the one or more structural characteristics of the data responsive to the natural question and the key dimensions and/or measures in the natural language question, visualization manager 128 may generate the graphical visualization of the data responsive to the natural language question.

In embodiments, visualization manager 128 may analyze the natural language question to determine key dimensions and/or measures in the natural language question. For example, visualization manager 128 may determine dimensions and/or measures explicitly mentioned and/or implicitly referenced in the natural language question. Visualization manager 128 may additionally determine how the key dimensions and/or measures may relate to each other and/or to the natural language question. In embodiments, a dimension may include qualitative values, such as names, dates, geographical data, IDs, etc., that may include descriptive attributes, and measures may include measurable, numeric, and/or quantitative values, such as numbers, percentages, counts, quantities, duration, etc. that may include computable or calculatable attributes. For example, in the example illustrated in FIG. 9, visualization manager 128 may analyze the natural language question "Display the top 3 chains, and the count of the claims associated with each chain" and may determine that several dimensions and measures are present. For example, the measures include the top three chains and the claim count associated with each chain, and the dimensions include at least the chains.

In embodiments, visualization manager 128 may analyze the responsive dataset (e.g., the data responsive to the natural language question) to determine one or more structural characteristics of the data responsive to the natural language. In embodiments, the structural characteristics of the data responsive to the natural language question may include a number of data points or records in the set of data responsive to the natural language question. For example, in embodiments, visualization manager 128 may determine the number of records or data points in the responsive dataset (e.g., in the set of data retrieved from dataset 170 in response to the execution of the query generated by AI model 160). For example, in the example illustrated in FIG. 9, visualization manager 128 may determine that the responsive dataset may include three data points or records. In embodiments, the number of data points may be used by graphical visualization 900 to determine a suitable type of graphical representation (e.g., chart, graph, line, diagram, map, etc.) that may accommodate the number of data points as well as to suitably visualize the response to the natural language question. For example, in this case, visualization manager 128 may know that a key measure includes the top three chains, which in the question refers to what is to be displayed.

In embodiments, the structural characteristics of the data responsive to the natural language question may include a number of fields (e.g., columns) in each data point in the responsive set. For example, in embodiments, visualization manager 128 may determine that each record in the responsive set in the example illustrated in FIG. 9 may include two fields or columns, namely the chainname and the claimcount fields. In embodiments, the structural characteristics of the data responsive to the natural language question may also include an indication of whether the fields of each data point in the responsive set are dimensions of measures. Identifying whether a field is a dimension or measure may include identifying the data type of the field. For example, visualization manager 128 may determine that the chainname field is a dimension, since the chainname field is a string, and that the claimcount field is a measure since the claimcount field is a count. In embodiments, visualization manager 128 may correlate the dimensions and measures identified in the responsive dataset to the key dimensions identified in the natural language question to determine a suitable graphical visualization. In this example, visualization manager 128 may correlate the measure value of a count claim in the natural language question to the measure value in the claimcount fields of the responsive dataset, and the dimension value of a chain (e.g., chain name) in the natural language question to the dimension value in the chainname fields of the responsive dataset. Based on the correlation, visualization manager 128 may determine that a bar graph 906 may be a suitable graphical visualization, and may use the chainname field of the responsive dataset as y-axis 902 and the claimcount field of the responsive dataset as x-axis 904.

In some embodiments, visualization manager 128 may determine a suitable type of graphical visualization based on key words within the data points of the responsive dataset. For example, in embodiments, keywords (e.g., year/month/days, geographical references, etc.) may be used by visualization manager 128 to determine a suitable type of graphical visualization for the responsive dataset. In some embodiments, a geographical reference may result in visualization manager 128 determining that a suitable type of graphical visualization for the responsive dataset may include a map. In the example illustrated in FIG. 9, visualization manager 128 may determine that the relationship between the fields of a datapoint (e.g., the chainname field and the claimcount field) may be one of a string with a name and a number with some value. In this example, visualization manager 128 may determine that a bar graph is a suitable graphical visualization for the responsive dataset.

In embodiments, visualization manager 128 may determine a suitable graphical visualization for the responsive dataset by determining a visualization model into which the data in the responsive dataset may fit. For example, visualization manager 128 may determine, based on the one or more structural characteristics of the responsive dataset, a visualization model that into which the responsive dataset may fit. In the example, illustrated in FIG. 9, visualization manager 128 may determine that the responsive dataset includes three data points, and each data point includes a dimension field and a measure field. In this example, visualization manager 128 may determine that the structure of the responsive dataset fits a bar graph, and in this case, visualization manager 128 may generate bar graph 906 to visualize the responsive dataset. In this case, as visualization manager 128 has knowledge regarding the dimensions and measures (e.g., chainname field and claimcount field), generating bar graph 906 may be based on this knowledge.

In another example, visualization manager 128 may determine that a responsive data set may include data related to changes over time. In this case, visualization manager 128 may determine that the structured of this responsive dataset may fit a line graph. In yet another example, visualization manager 128 may determine that a responsive data set may include data in which each data point is a percentage of a whole. In this case, visualization manager 128 may determine that the structured of this responsive dataset may fit a pie chart.

It is noted that, in some embodiments, visualization manager 128 may analyze the entire responsive dataset to determine a model into which the structure of the responsive dataset may fit. For example, visualization manager 128 may analyze the entire responsive dataset and may determine that each data point includes a number value, and that the number value of all the data points add up to 100%. In this case, visualization manager 128 may determine that the structured of this responsive dataset may fit a pie chart, as a pie chart may be suitable to represent percentages of a whole.

In some embodiments, visualization manager 128 may determine a suitable graphical visualization for the responsive dataset based on user characteristics. For example, a user may be color-blind, in which case, visualization manager 128 may determine to visualize the responsive dataset using a bar graph or a line chart, rather than a pie chart that may require different colors for each element.

In embodiments, visualization manager 128 may be configured to provide a mechanism for modifying the visualization generated by visualization manager 128. For example, as shown in FIG. 9, graphical visualization 900 may include control elements 908 and 910. In this example, control element 908 may include a mechanism (e.g., a selectable button, drop-down menu, a text box) for a user to modify which of the identified dimensions and measures may be used as x-axis 902 in the chart 906. In this example, control element 910 may include a mechanism (e.g., a selectable button, drop-down menu, a text box) for a user to modify which of the identified dimensions and measures may be used as y-axis 904 in chart 906. In this manner, the user may customize the graphical visualization 900 provided by visualization manager 128.

Figure 2:
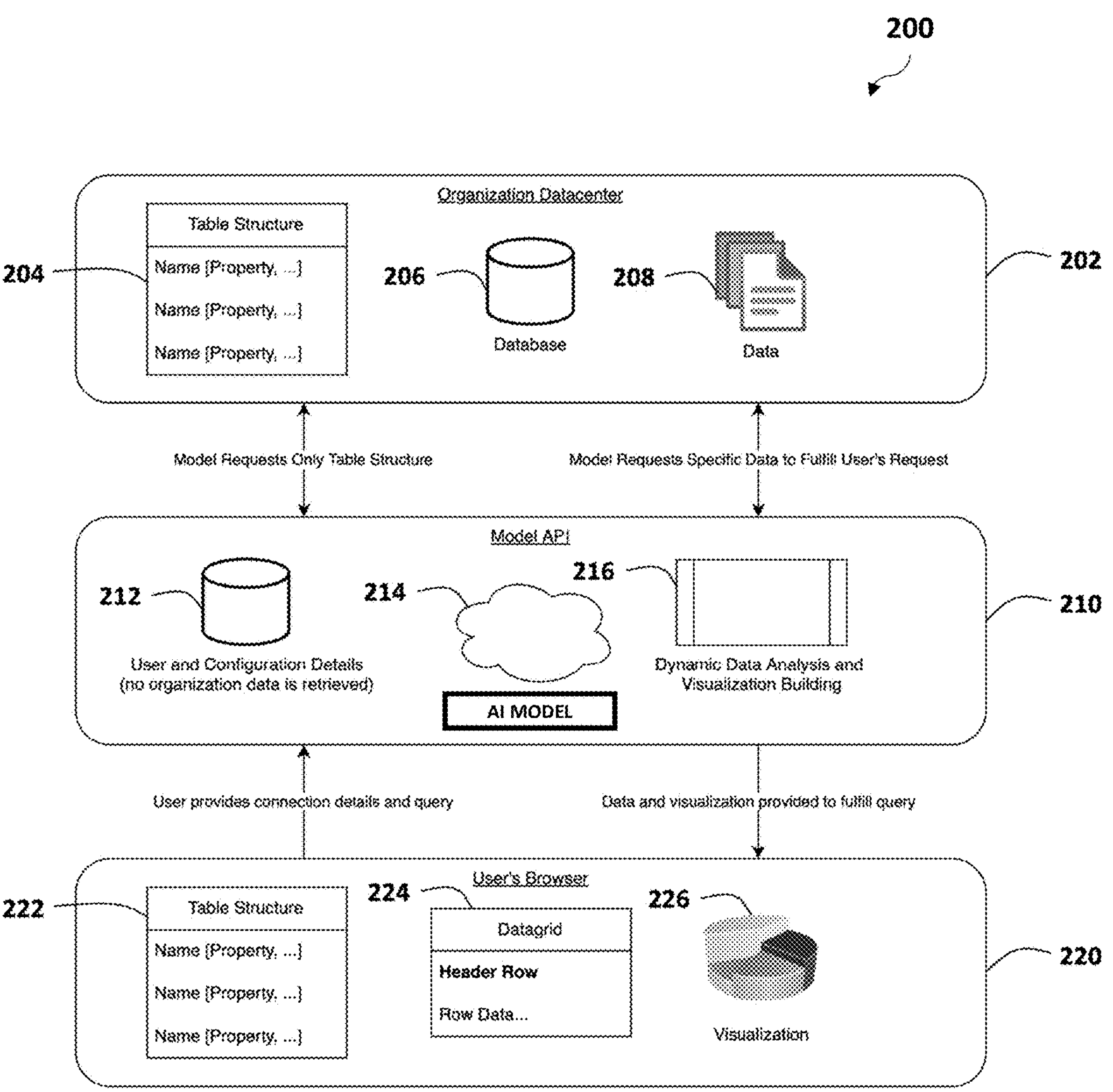
FIG. 2 illustrates a schematic view of a system configured with capabilities and functionality for processing and visualizing natural language queries in accordance with one or more exemplary embodiments of the present disclosure.

FIG. 2 illustrates a schematic view of a system 200 configured with capabilities and functionality for processing and visualizing natural language queries in accordance with one or more exemplary embodiments of the present disclosure. In embodiments, system 200 may include a system (e.g., system 100) implemented in accordance with embodiments of the present disclosure, and may incorporate one or more of dataset structure mapper 120, structure configuration manager 122, query request manager 124, query manager 126, and visualization manager 128 of system 100, among other relevant modules. System 200 may include organization datacenter 202, model API 210, and client 220 (e.g., computer having a user interface), among other suitable components. In embodiments, operations of system 200 may leverage functionality similar to the functionality of system 100, as described herein, to process and visualize natural language queries in accordance with one or more exemplary embodiments of the present disclosure.

Organization datacenter 202 may include database 206 configured to store data. In embodiments, database 206 may be or may include a dataset (e.g., dataset 170 of FIG. 1) having a structure 204. In embodiments, the functionality and features of database 206 may be similar to the functionality and features of dataset 170 of FIG. 1 described herein.

Client 220 may represent a client systems via which a user may interact with system 200 to provide configuration details, to provide database connection details, to provide details or answer questions related to structure 204 of database 206, to input natural language questions, to validate data responsive to the natural language questions, to provide a graphical user interface via which the responsive data 224 and/or the graphical visualization 226 may be displayed, etc. In embodiments, the functionality and features of client 220 may be similar to the functionality and features of the clients described with reference to FIG. 1.

Model API 212 may include AI model 214, which may include functionality and features similar to the functionality and features of AI model 160 of FIG. 1 described herein. Model API 212 may include user and configuration details module 212, which may include functionality and features similar to the cooperative functionality and features of dataset structure mapper 120, structure configuration manager 122, and query request manager 124 of system 100, among other relevant modules of FIG. 1 described herein. Model API 212 may include dynamic data analysis and data visualization building module 216, which may include functionality and features similar to the cooperative functionality and features of query manager 126 and visualization manager 128 of system 100, among other relevant modules of FIG. 1 described herein.

Model API 212 may represent functionality of system 200 to interact with organization datacenter 202 and client 220 to obtain structure 204 of database 206, such as in accordance with the functionality of dataset structure mapper 120 of FIG. 1. For example, a user may provide, via client 220, details for connecting to database 206 (e.g., manual or guided), and user and configuration details module 212 may connect to database 206 using the connection details to obtain structure 204 of database 206, such as described herein with respect to FIG. 1.

The functionality of model API 212 may include interacting with AI model 214 and client 220 to optimize, refine, revise, and/or otherwise finalize structure 204 of database 206, such as in accordance with the functionality of structure configuration manager 122 of FIG. 1. In embodiments, optimizing and/or finalizing structure 204 of database 206 may include providing structure 204 to AI model 214 to determine if additional configuration data may be needed by AI model 214 to be able to generate queries that may be executed against database 206 to retrieve data responsive to natural language questions, such as described herein with respect to FIG. 1. In embodiments, AI model 214 may generate questions that may be presented (e.g., via client 220) to the user and the answers provided by the user may be included as configuration data with structure 204, such as described herein with respect to FIG. 1.

The functionality of model API 212 may include interacting with AI model 214 and client 220 to receive a natural language question from the user, and to request a query for retrieving data from database 206 responsive to the natural language question, such as in accordance with the functionality of query request manager 124 of FIG. 1. In embodiments, requesting a query for retrieving data from database 206 responsive to the natural language question may include providing structure 204 of database 206, the additional configuration data provided by the user, and the natural language questions to AI model 214, which may generate a query based on the information provided, such as described herein with respect to FIG. 1.

The functionality of model API 212 may include functionality for validating the query generate by AI model 214, which may include an iterative process that may include sanitizing the query, executing the query to determine if any exceptions occur when executing the query, and/or interacting with the user (e.g., via client 220) to determine whether the data retrieved from the execution of the query accurately answers the natural language process, such as described herein with respect to query manager 126 of FIG. 1. In embodiments, this may include an interactive process that may continue until a responsive dataset 224 (e.g., a data set accurately responsive to the natural language question) may be obtained, such as described herein with respect to FIG. 1.

The functionality of model API 212 may include interacting with client 220 to provide graphical visualization 226 of responsive dataset 224, such as in accordance with the functionality of visualization manager 128 of FIG. 1. In embodiments, responsive dataset 224 may be analyzed to determine one or more structural characteristics of the data in responsive dataset 224, and/or the natural language question may be analyzed to determine key dimensions and/or measures in the natural language question, such as described herein with respect to FIG. 1. Based on the one or more structural characteristics of the data in responsive dataset 224 and the key dimensions and/or measures in the natural language question, graphical visualization 224 may be generated and presented to the user via client 220, such as described herein with respect to FIG. 1.

Figure 3:
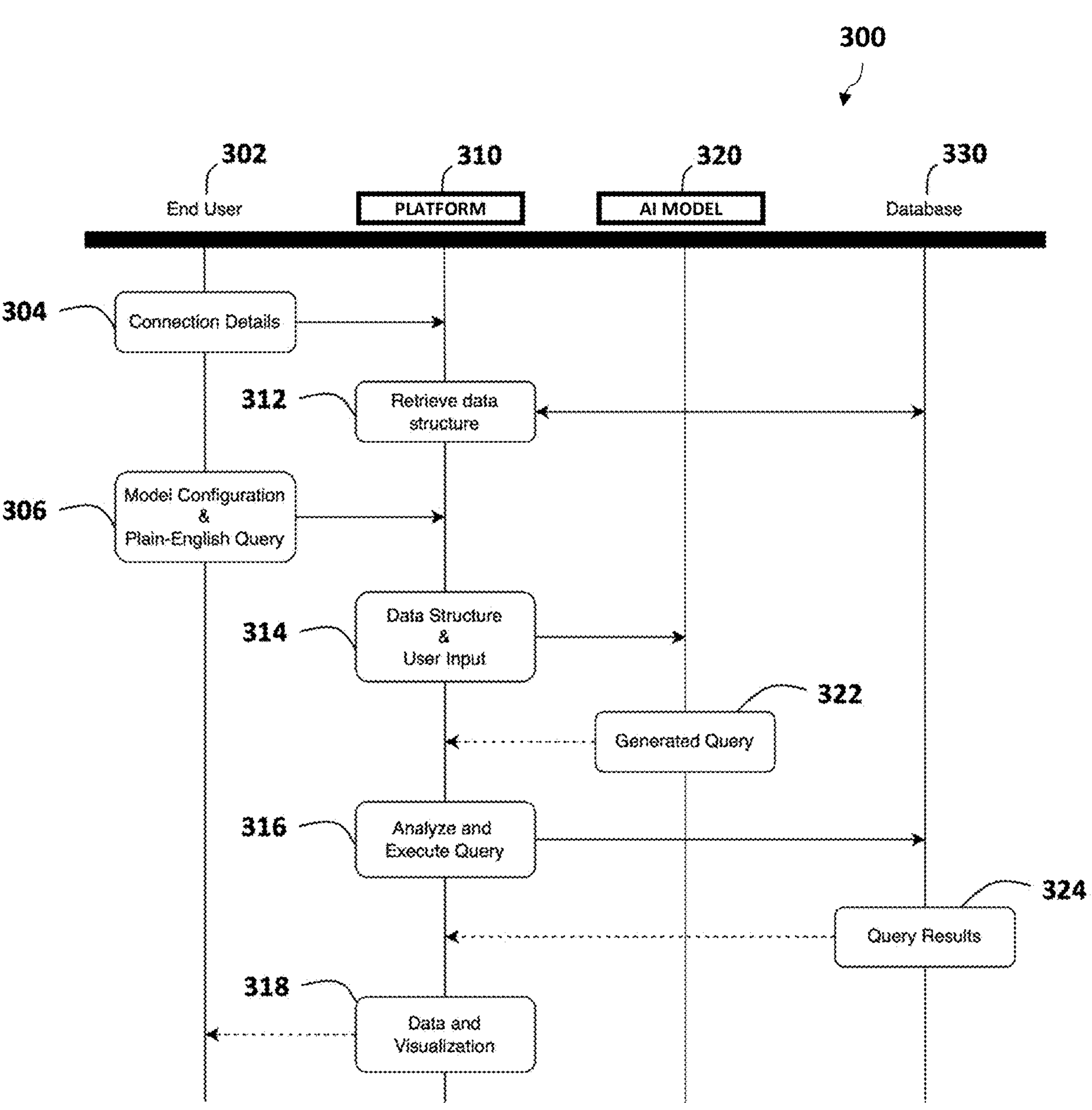
FIG. 3 illustrates a flowchart exemplifying natural language query processing and visualization control logic, in accordance with one or more exemplary embodiments of the present disclosure.

FIG. 3 illustrates a flowchart exemplifying natural language query processing and visualization control logic 300, in accordance with one or more exemplary embodiments of the present disclosure. The specific steps of control logic 300 will be described with additional reference to FIGS. 4-8.

Control logic 300 may be implemented as an algorithm on a server 110, a machine learning module, a client, a database, or other suitable system. Additionally, the control logic 300 may implement or incorporate one or more features of system 100, such as dataset structure mapper 120, structure configuration manager 122, query request manager 124, query manager 126, and visualization manager 128 of system 100, among other relevant modules. The control logic 300 may be achieved with software, hardware, an application programming interface (API), a network connection, a network transfer protocol, HTML, DHTML, JavaScript, JSON, or other suitable applications, or a suitable combination thereof.

In embodiments, control logic 300 may leverage the ability of a computer platform to spawn multiple processes and threads by processing data simultaneously. The speed and efficiency of control logic 300 may be greatly improved by instantiating more than one process to implement natural language query processing and visualization in accordance with embodiments of the present disclosure. However, one skilled in the art of programming will appreciate that use of a single processing thread may also be utilized and is within the scope of the present disclosure.

As shown in FIG. 3, control logic 300 may represent operations that may include interactions between end user 302, platform 310, AI model 320, and database 330. In embodiments, end user 302 may include functionality and features that may be similar to the functionality and features of the clients described with reference to FIG. 1 and/or client 220 described with reference to FIG. 2. In embodiments, platform 310 may include functionality and features that may be similar to the functionality and features of system 100 described with reference to FIG. 1 and/or system 200 described with reference to FIG. 2. In embodiments, AI model 320 may include functionality and features that may be similar to the functionality and features of AI model 160 described with reference to FIG. 1 and/or AI model 214 described with reference to FIG. 2. In embodiments, database 330 may include functionality and features that may be similar to the functionality and features of dataset 170 described with reference to FIG. 1 and/or database 206 described with reference to FIG. 2.

Figure 4:
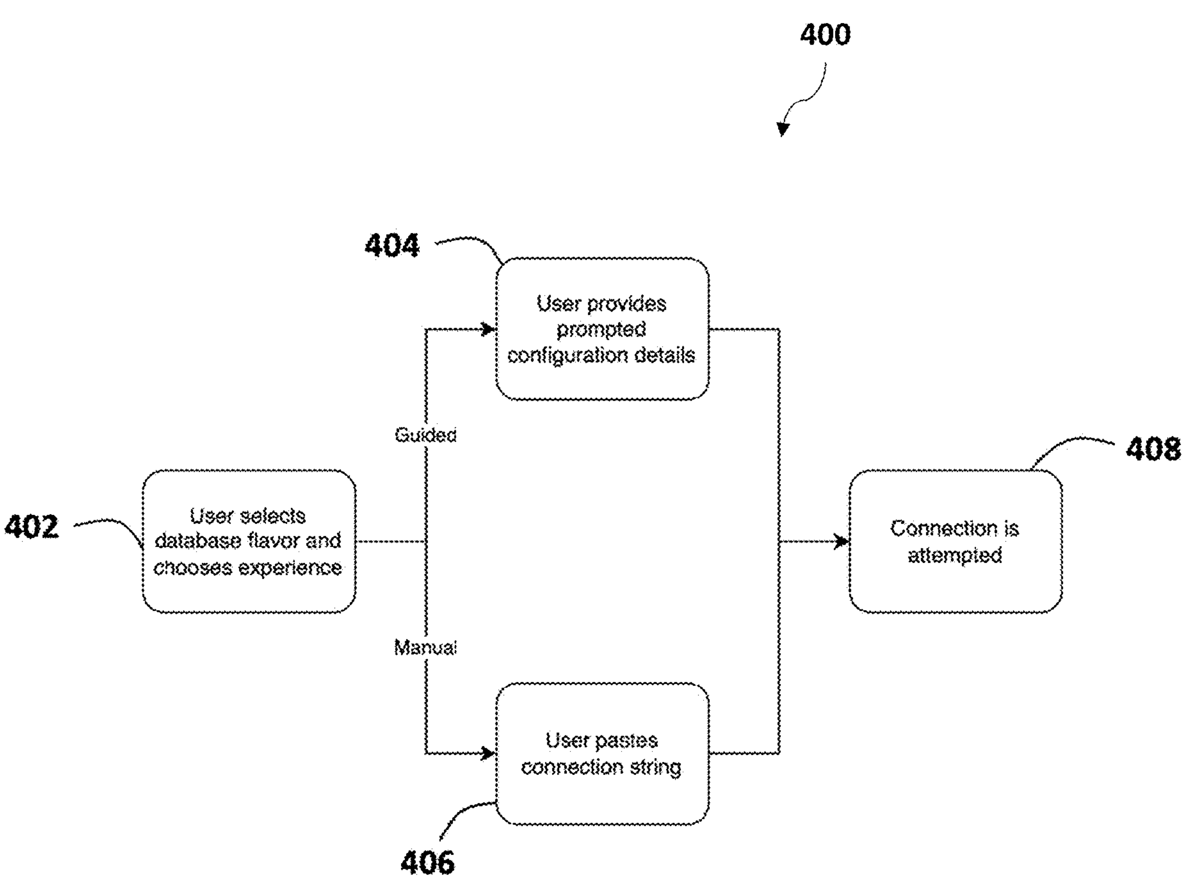
FIG. 4 is a block diagram illustrating example blocks for obtaining connection details in accordance with embodiments of the present disclosure.

At 304, connection details may be obtained by platform 310 from end user 302. In embodiments, the connection details may include details for connecting to database 330. In embodiments, platform 310 may obtain the connection details from end user 302 in accordance with the functionality of dataset structure mapper 120 described with reference to FIG. 1. For example, FIG. 4 is a block diagram illustrating example blocks for obtaining connection details in accordance with embodiments of the present disclosure. In embodiments, functionality of a dataset structure mapper (e.g., dataset structure mapper 120 as shown in FIG. 1) may be used to perform the steps in the blocks of FIG. 4 to obtain the connection details. At block 402, the user may select a database “flavor” and an experience. For example, a database “flavor” may include a database type for database 330, such as a platform or database management system used for implementing database 330. Selecting the experience may include whether the user is to provide the connection details using a manual process or a guided process (e.g., as described herein with respect to FIG. 1). In embodiments, at block 406, in response to the user selecting a manual experience, the user may provide a connection string to enable a connection to database 330 (e.g., such as described herein with respect to FIG. 1). At block 404, in response to the user selecting a guided experience, the user may be prompted to provide information for establishing a connection to database 330. For example, the user may be prompted to provide (e.g., in addition to a database type) a database name, a user ID, a password, a host address, and/or any other information determined to be required for connecting to database 330. At block 408, platform 310 may attempt to connect to database 330. For example, platform 310 may use the information provided by the user (e.g., guided or manual) to connect to database 330.

With reference back to FIG. 3, at 312, platform 312 may retrieve a data structure of database 330. For example, once connected to database 330, platform 312 may perform a scan of database 330 to determine the structure of database 330. In embodiments, platform 310 may retrieve the data structure of database 330 in accordance with the functionality of dataset structure mapper 120 described with reference to FIG. 1. For example, in embodiments, platform 312 may execute one or more predefined queries against database 330 to obtain details of the structure of the data in database 330 (e.g., such as described herein with respect to FIG. 1). In embodiments, platform 312 may obtain the structure of the tables in database 330 and/or the relationships between the tables (e.g., such as described herein with respect to FIG. 1).

Figure 5:
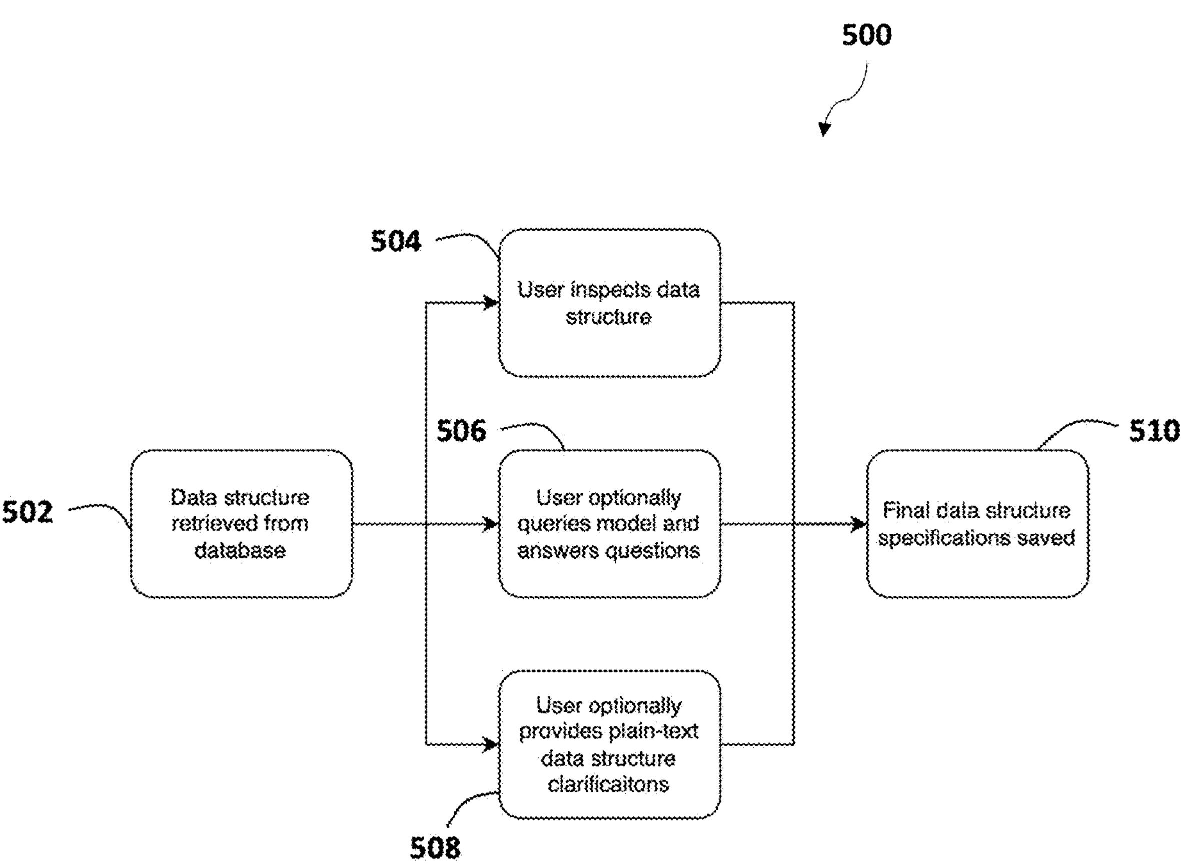
FIG. 5 is a block diagram illustrating example blocks for optimizing the data structure of the database in accordance with embodiments of the present disclosure.

At 306, model configuration and plain-text (e.g., plain-English, and/or other language) query may be received by platform 310 from end user 302. In embodiments, model configuration may include configuration data that may be used to optimize the structure of database 330 obtained at 312, and may include additional configuration data that AI model may use for increasing the likelihood of generating a query that may yield data responsive to the plain-text query. In embodiments, the plain-text query may include a natural language question (e.g., such as described herein with respect to FIG. 1). In embodiments, platform 310 may receive model configuration and plain-text query in accordance with the functionality of structure configuration manager 122 and query request manager 124 described with reference to FIG. 1. For example, FIG. 5 is a block diagram illustrating example blocks for optimizing the data structure of the database in accordance with embodiments of the present disclosure. In embodiments, functionality of a structure configuration manager (e.g., structure configuration manager 122 as shown in FIG. 1) may be used to perform the steps in the blocks of FIG. 5 to optimize the data structure of database 330.

At block 502, the structure of database 330 is retrieved. For example, functionality of the structure configuration manager may be used to connect to database 330 and to retrieve the structure of database 330 according to operations and functionality as described above with reference to structure configuration manager 122 and as illustrated in FIG. 1. At block 504, end user 302 may optionally inspect the structure of database 330 obtained by platform 310 to determine whether additional structure data (e.g., configuration data) may be needed to increase the likelihood that a query generated by AI model 320 may yield data from database 330 that may be accurately responsive to a natural language question related to database 330. In embodiments, functionality of the structure configuration manager may be used to enable end user 302 to provide the additional structure data, or configuration data, according to operations and functionality as described above with reference to structure configuration manager 122 and as illustrated in FIG. 1.

At block 506, end user 302 may optionally query AI model 320 to determine whether additional structure data (e.g., configuration data) may be needed by AI model 320 to generate a query that may be executed against database 330 to retrieve data that may be accurately responsive to a natural language question related to database 330. In embodiments, AI model 320 may analyze the structure of database 330 and may determine whether additional structure data (e.g., configuration data) may be needed by AI model 320 to generate a query that may be executed against database 330 to retrieve data that may be accurately responsive to a natural language question related to database 330. In the affirmative case, AI model 320 may generate one or more questions that may be answered by end user 302 providing the additional structure data determined to be needed by AI model 320. In embodiments, functionality of the structure configuration manager may be used to enable AI model 320 to analyze the structure of database 330 and to determine whether additional structure data may be needed by AI model 320 to generate a query that may be executed against database 330 to retrieve data that may be accurately responsive to a natural language question related to database 330 and to generate the one or more questions configured to request the additional structure data from end user 302, and to enable end user 302 to provide answers to the additional questions providing the additional structure data according to operations and functionality as described above with reference to structure configuration manager 122 and as illustrated in FIG. 1.connect to database 330 and to retrieve the structure of database 330 according to operations and functionality as described above with reference to structure configuration manager 122 and as illustrated in FIG. 1.

At block 508, end user 302 may optionally provide additional structure data (e.g., configuration data) related to the structure of database 330 in plain-text clarification statements. In embodiments, functionality of the structure configuration manager may be used to enable end user 302 to provide the additional structure data (e.g., configuration data) related to the structure of database 330 in plain-text clarification statements according to operations and functionality as described above with reference to structure configuration manager 122 and as illustrated in FIG. 1.

At block 510, the finalized structure of database 330 may be saved. For example, in embodiments, the structure of database 330 and the additional structure data, or configuration data, provided by end user 302, may be stored by platform 310, as finalized structure data associated with database 330. In embodiments, functionality of the structure configuration manager may be used to save the finalized structure associated with database 330 according to operations and functionality as described above with reference to structure configuration manager 122 and as illustrated in FIG. 1.

With reference back to FIG. 3, at 314, platform 310 may provide the finalized structure associated with database 330 and the plain-text query provided by end user 302 to AI model 320. In embodiments, platform 310 may request AI model 320 to generate a query (e.g., a database language, such as SQL, query) for retrieving data from database 330 responsive to the plain-text query. In embodiments, functionality of a query request manager (e.g., query request manager 124 as shown in FIG. 3) may be used to provide the finalized structure associated with database 330 and the plain-text query provided by end user 302 to AI model 320 to request AI model 320 to generate a query for retrieving data from database 330 responsive to the plain-text query. In embodiments, the query request manager may perform operations to provide the finalized structure associated with database 330 and the plain-text query provided by end user 302 to AI model 320 to request AI model 320 to generate a query for retrieving data from database 330 responsive to the plain-text query according to operations and functionality as described above with reference to query request manager 124 and as illustrated in FIG. 1.

Figure 6:
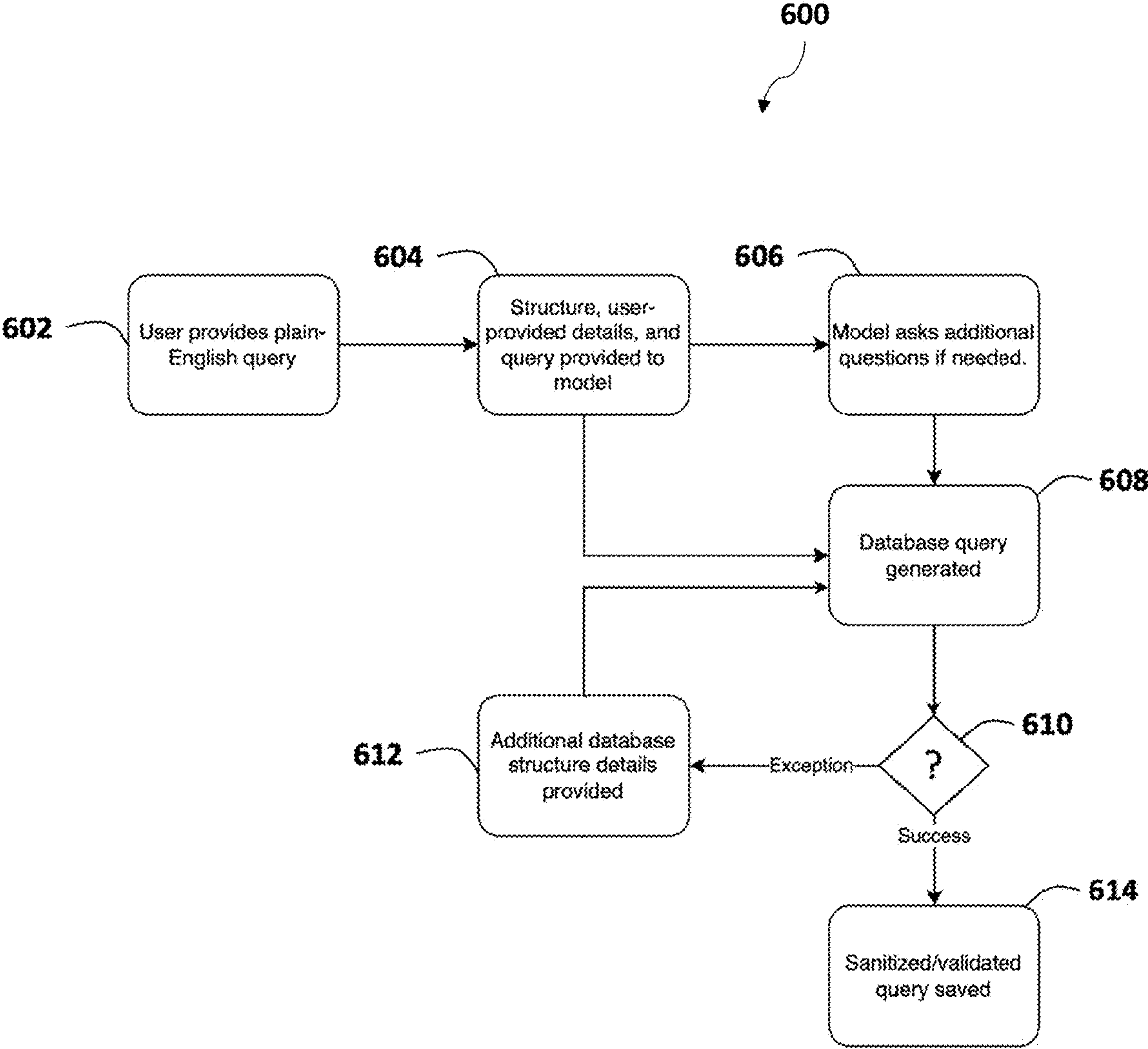
FIG. 6 is a block diagram illustrating example blocks for obtaining and validating a query configured to retrieve data responsive to a natural language question from a database in accordance with embodiments of the present disclosure.

At 322, AI model 320 may generate the query that may be executed against database 330 to retrieve data responsive to the plain-text query and may provide the query to platform 310. At 316, platform 310 may analyze and execute the query provided by AI model 320 against database 330. At 324, query results (e.g., data retrieved in response to the execution of the query) may be retrieved by platform 310 from database 330. In embodiments, analyzing and executing the query may include validating the query and executing the query, such as according to operations and functionality as described above with reference to query manager 126 and as illustrated in FIG. 1. For example, FIG. 6 is a block diagram illustrating example blocks for obtaining and validating a query configured to retrieve data responsive to a natural language question from a database in accordance with embodiments of the present disclosure. In embodiments, functionality of a query manager (e.g., query manager 126 as shown in FIG. 1) may be used to perform the steps in the blocks of FIG. 6.

At block 602, end user 302 may provide the plain-text query. For example, as described herein with respect to FIGS. 1 and 2, end user 302 may be provided with a mechanism to input a natural language question related to the data in database 330, such as according to the description of query request manager 124 with respect to FIG. 1. At block 604, the finalized (or optimized) structure of database 330, which may include the structure of database 330, additional configuration (or structure) data provided by end user 302, and the plain-text query may be provided to AI model 320. At block 606, AI model 320 may determine, based on the finalized data structure, additional configuration (or structure) data provided by end user 302, and the plain-text query, that additional information may be needed to be able to generate the query. In embodiments, AI model 320 may generate one or more questions configured to obtain the additional information from end user 302. The one or more questions may be presented to end user 302 and the answers provided by end user 302 may be provided to AI model 320 to enable AI model 320 to generate the query. In some embodiments, this process may be iterative in which end user 302 may be requested to answer questions from AI model 320 until AI model 320 determines that AI model 320 is able to generate the query. Further details of this process are provided in the description of query manager 126 of FIG. 1.

At block 608, AI model 320 may generate the query. In embodiments, the query generated by AI model 320 may be validated. Validating the query may include sanitizing the query, determining whether execution of the query generates one or more exceptions, and/or determining whether data retrieved in response to execution of the query includes data that accurately answers the plain-text query. In embodiments, functionality of a query manager may be used to validate the query according to operations and functionality as described above with reference to query manager 126 and as illustrated in FIG. 1. For example, at block 610, a determination may be made as to whether an exception has occurred in response to execution of the query provide by AI model 320. In response to a determination that an exception has occurred in response to execution of the query provide by AI model 320, at block 612, end user 302 may be prompted to provide further structure details of database 330 based on the exception that occurred. The further structure details may be provided to AI model 320, and AI model 320 may generate a new query, or may revise the previously generated query, based on the further structure details.

In some embodiments, the query provided by AI model 320 may be executed against database 320 and the data retrieved in response to the execution of the query may be analysed to determine whether the data retrieved in response to the execution of the query accurately answers the plain-text question. For example, the data retrieved in response to the execution of the query may be analysed using an automated analytical model to determine if the data accurately answers the plain-text question. In some embodiments, the data retrieved in response to the execution of the query may be presented to end user to determine whether the data accurately answers the plain-text question. In embodiments, in response to a determination that the data retrieved in response to the execution of the query does not accurately answer the plain-text question, end user 302 may be prompted to provide further details related to the inaccuracies of the data. The additional details may be provided to AI model 320, and AI model 320 may generate a new query, or may revise the previously generated query, based on the additional details The revised or new query may be again validated to sanitize the new query, to determine whether exceptions occur during execution of the new query, and/or to determine whether the data retrieved in response to the execution of the new query accurately answers the plain-text question. In embodiments, this process may be iterative in which the query generated by AI model 320 is validated and if found not to be valid, additional details are requested from end user 302 to be provided to AI model 320 for revising the query until the query is found to be valid. Further details of this process are provided in the description of query manager 126 of FIG. 1.

Figure 7:
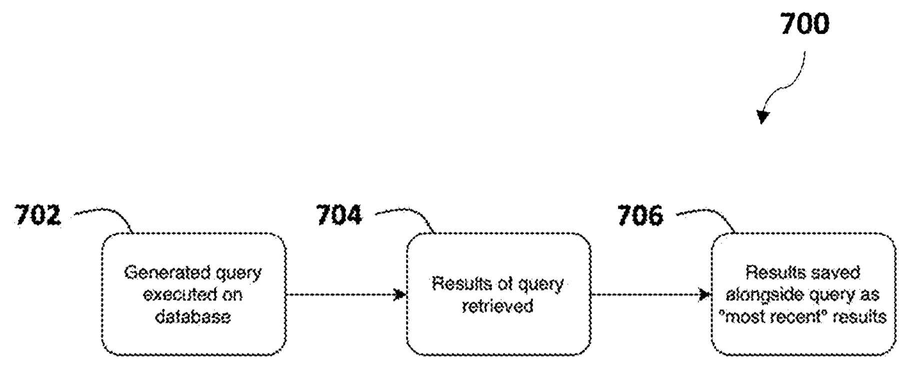
FIG. 7 is a block diagram illustrating example blocks for retrieving data from a database from execution of a query in accordance with embodiments of the present disclosure.

At block 614, the validated query may be saved by platform 310. For example, FIG. 7 is a block diagram illustrating example blocks for retrieving data from a database from execution of a query in accordance with embodiments of the present disclosure. In embodiments, functionality of a query manager (e.g., query manager 126 as shown in FIG. 1) may be used to perform the steps in the blocks of FIG. 7. At block 702, the validated query may be executed against database 330, and at block 704, the query results of the validated query may be retrieved from database 330 in response to the execution of the validated query. At this point, the data retrieved in response to the execution of the validated query may represent a responsive dataset (e.g., a set of data accurately responsive to the plain-text query). At block 706, the validated query and the responsive dataset may be stored by platform 310 as "most recent" results. In embodiments, the "most recent" results may be provided to end user 302 (e.g., via a GUI) and end user 302 may have access to the validated query and the responsive dataset. In some embodiments, upon selection of the validated query, the validated query may be executed against database 330 to update the responsive dataset. In this manner, the responsive dataset may be updated in case the data in database 330 has changed after the most recent execution of the validated query, and so the responsive dataset may not be stale. In some embodiments, the validated query may be made available to other users associated with end user 302 (e.g., in the same organization or authorized by end user 302).

With reference back to FIG. 3, at 318, platform 310 may provide the responsive dataset and a visualization of the responsive dataset to end user 302. In embodiments, providing the responsive dataset may include displaying the data retrieved in response to the execution of the validated query. In embodiments, providing the visualization of the responsive dataset to end user 302 may include generating a graphical visualization of the responsive dataset and provided the graphical visualization to end user 302, such as according to operations and functionality as described above with reference to visualization manager 28 and as illustrated in FIG. 1.

Figure 8:
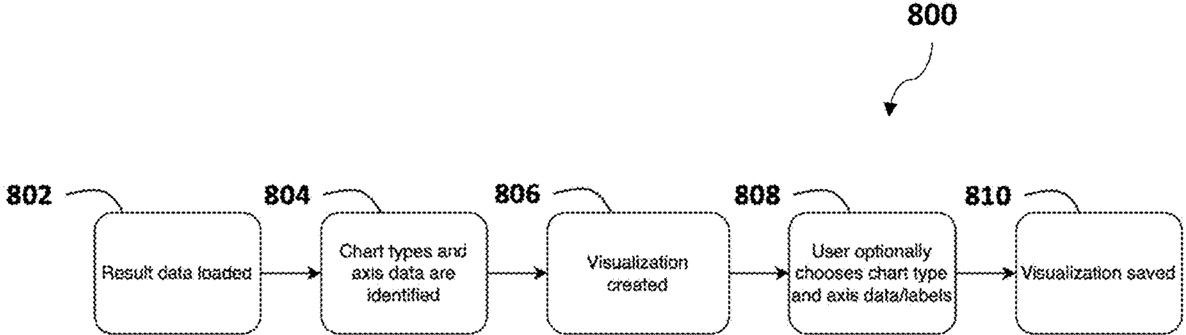
FIG. 8 is a block diagram illustrating example blocks for generating and providing a graphical visualization of data responsive to a natural language question in accordance with embodiments of the present disclosure.
Figure 10:
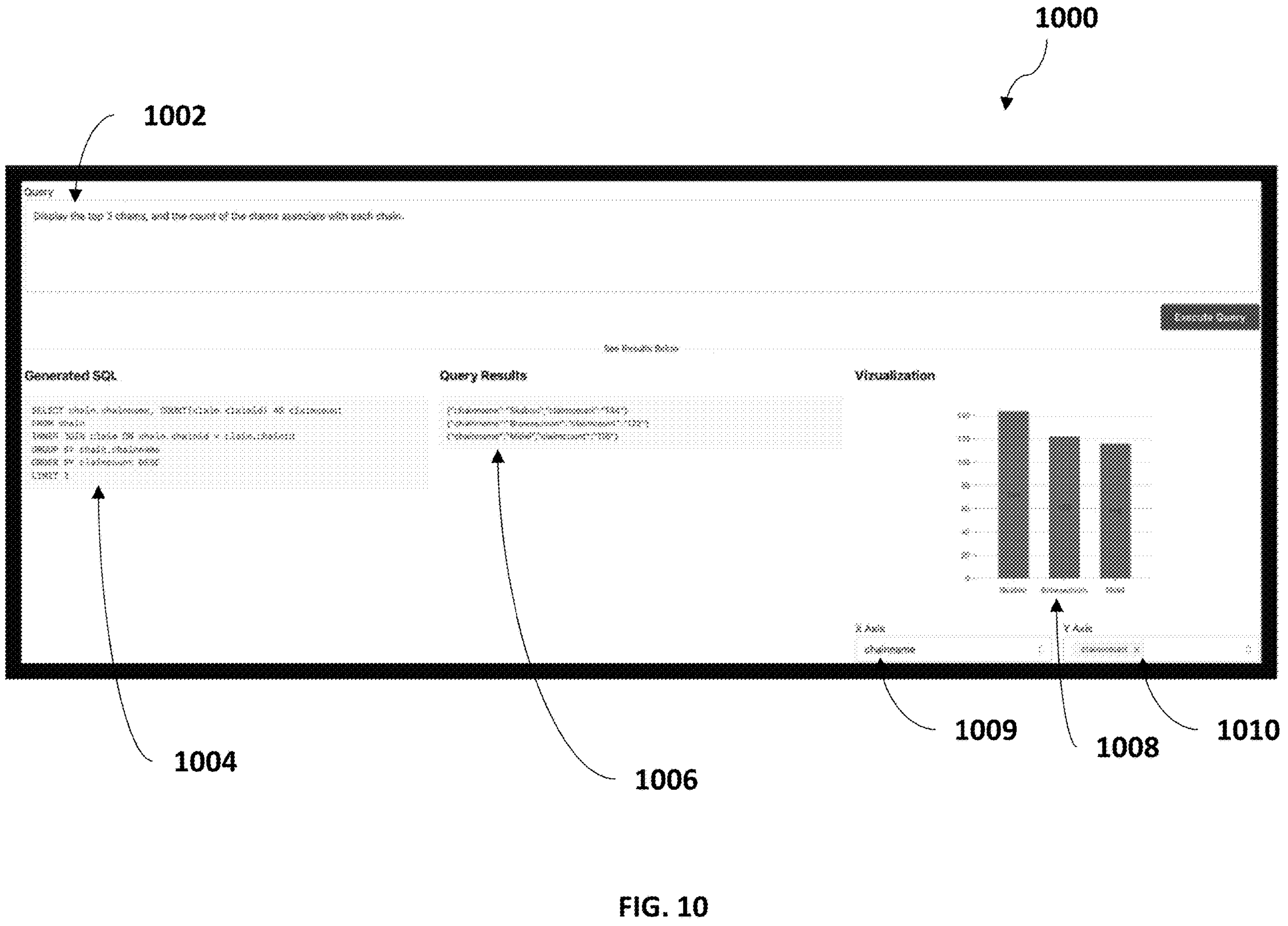
FIG. 10 illustrates an exemplary embodiment of a graphical interface presenting a graphical visualization of data responsive to a natural language question in accordance with embodiments of the present disclosure.

For example, FIG. 8 is a block diagram illustrating example blocks for generating and providing a graphical visualization of data responsive to a natural language question in accordance with embodiments of the present disclosure. The operations described with the blocks of FIG. 8 will be described with additional reference to FIG. 10. FIG. 10 illustrates an exemplary embodiment of a graphical interface 1000 presenting a graphical visualization of data responsive to a natural language question in accordance with embodiments of the present disclosure.

In embodiments, functionality of a visualization manager (e.g., visualization manager 128 as shown in FIG. 1) may be used to perform the steps in the blocks of FIG. 8. At block 802, the responsive dataset may be loaded (e.g., retrieved) by platform 310. For example, as shown in FIG. 10, which may be related to the example above in which database 330 may be associated with a healthcare application, plain-text query 1002 input by the user may include "Display the top 3 chains, and the count of the claims associated with each chain." In this example, platform 310 may display, in graphical interface 1000, validated query 1004, representing a query generated by AI model 320 that was validated. Platform 310 may also display responsive dataset 1006, which may include data that is accurately responsive to plain-text query 1002.

At block 804, a chart type and axis data may be identified. For example, in embodiments, responsive dataset 1006 may be analyzed to determine one or more structural characteristics of the data in the responsive dataset 1006. In some embodiments, plain-text query 1002 may also be analyzed to determine key dimensions and/or measures in plain-text query 1002, such as described with respect to visualization manager 128 in FIG. 1. In embodiments, based on the one or more structural characteristics of the data in responsive dataset 1006 and/or the key dimensions and/or measures in the plain-text query 1002, graphical visualization 1008 may be generated, at block 806, and presented to end user 302 using GUI 1000. As shown, graphical visualization 1008 may include a bar graph and may include an x-axis and a y-axis. In this example, platform 310 may analyze responsive dataset 1006 to identify dimensions and/or measured in the fields of responsive dataset 1006 and may assign a first field of responsive dataset 1006 to the x-axis of graphical visualization 1008 and a second field of responsive dataset 1006 to the y-axis of graphical visualization 1008. Details of an exemplary technique for determining a type of graphical visualization and for assigning the x-axis and the y-axis of the graphical visualization are described herein, such as with respect to visualization manager 128 of FIG. 1.

At block 808, end user 302 may optionally select to modify the graphical visualization presented. For example, in embodiments, a mechanism for modifying graphical visualization 1008 may be provided, which may include drop-down menus 1009 and 1010. In this example, drop-down menu 1009 may be configured to enable end user 302 to modify which of the identified dimensions and measures in responsive dataset 1006 may be used as the x-axis for graphical visualization 1008. Additionally in this example, drop-down menu 1010 may be configured to enable end user 302 to modify which of the identified dimensions and measures in responsive dataset 1006 may be used as the y-axis for graphical visualization 1008. In this manner, the user may customize graphical visualization 1008. At block 810, the graphical visualization may be saved. For example, the graphical visualization provided by the saved by platform 310 and may be presented (e.g., as a thumbnail) to end user 302.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f), absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

Although the present disclosure and its advantages have been described in detail, it should be understood that various changes, substitutions and alterations can be made herein without departing from the spirit and scope of the disclosure as defined by the appended claims. Moreover, the scope of the present disclosure is not intended to be limited to the particular embodiments of the process, machine, manufacture, composition of matter, means, methods, and steps described in the specification. As one of ordinary skill in the art will readily appreciate from the disclosure of the present systems, devices, processes, machines, manufactures, compositions of matter, means, methods, or steps, presently existing or later developed that perform substantially the same function or achieve substantially the same result as the corresponding embodiments described herein may be utilized according to the present invention. Accordingly, the appended claims are intended to include within their scope such existing and later developed processes, machines, manufacture, compositions of matter, means, methods, or steps.

What is claimed is:

1. A natural language query processing and visualization system, comprising:

at least one processor; and a memory operably coupled to the at least one processor and storing processor-readable code that, when executed by the at least one processor, is configured to perform operations including:

identifying a structure associated with a dataset;

receiving a natural language question related to data in the dataset;

providing the structure associated with the dataset and the natural language question to an AI model to receive, from the AI model, data responsive to the natural language question;

analyzing the data responsive to the natural language question to determine one or more structural characteristics of the data responsive to the natural language question; and generating a graphical visualization of the data responsive to the natural language question based on the one or more structural characteristics of the responsive data.

2. The system of claim 1, wherein obtaining the structure associated with the dataset includes:

obtaining connection information for connecting with a database including the dataset;

connecting with the database to obtain the structure associated with the dataset.

3. The system of claim 1, further comprising one or more of:

enabling a user to verify the structure associated with the dataset and to revise the structure associated with the dataset to facilitate generation by the AI model of queries for answering natural language questions based on the structure associated with the dataset;

enabling the user to reply to one or more questions received from the AI model related to the structure associated with the dataset to facilitate generation by the AI model of queries for answering natural language questions based on the structure associated with the dataset; and enabling the user to provide natural language statements associated with the dataset to facilitate generation by the AI model of queries for answering natural language questions based on the structure associated with the dataset.

4. The system of claim 1, wherein the natural language question includes one or more of:

a natural language inquiry related to the data in the dataset; and a natural language instruction related to the data in the dataset.

5. The system of claim 1, further comprising:

receiving, from the AI model, the query for retrieving the data responsive to the natural language question, wherein the query is formatted using a database query language.

6. The system of claim 5, further comprising:

receiving, prior to receiving the query from the AI model, one or more questions from the AI model related to one or more of the structure associated with the dataset and the natural language question to facilitate generation by the AI model of the query for retrieving the data responsive to the natural language question.

7. The system of claim 1, further comprising validating the query received from the AI model, wherein validating the query includes one or more of:

determining whether the query is sanitized;

determining whether the query is able to be successfully executed against the data in the dataset; and determining whether a set of data retrieved by the execution of the query against the data in the dataset is accurately responsive to the natural language question.

8. The system of claim 7, wherein results of validating the query received from the AI model are fed back to the AI model for refining the query for retrieving data responsive to the natural language question.

9. The system of claim 1, wherein the one or more structural characteristics of the data responsive to the natural language question include:

one or more dimension associated with the data responsive to the natural language question; and one or more measure associated with the data responsive to the natural language question.

10. The system of claim 9, wherein generating the graphical visualization of the data responsive to the natural language question includes:

mapping the one or more dimension and the one or more measure to the structure associated with the dataset to generate the graphical visualization of the data responsive to the natural language question.

11. The system of claim 1, wherein the graphical visualization of the data responsive to the natural language question is of a type including one or more of a pie graph or chart, a line graph or chart, and a bar graph or chart.

12. The system of claim 11, further comprising:

receiving, from a user, a request to modify the graphical visualization of the data responsive to the natural language question;

enabling the user to modify the graphical visualization of the data responsive to the natural language question; and displaying the modified graphical visualization.

13. The system of claim 12, wherein the modification of the graphical visualization of the data responsive to the natural language question includes one or more of:

modification of the graphical visualization from a first type of graphical visualization to a second type of graphical visualization; and modification of one or more labels associated with the graphical visualization of the data responsive to the natural language question.

14. A method of processing and visualizing natural language queries, comprising:

identifying a structure associated with a dataset;

receiving a natural language question related to data in the dataset;

providing the structure associated with the dataset and the natural language question to an AI model to receive, from the AI model, data responsive to the natural language question;

analyzing the data responsive to the natural language question to determine one or more structural characteristics of the data responsive to the natural language question; and generating a graphical visualization of the data responsive to the natural language question based on the one or more structural characteristics of the responsive data.

15. The method of claim 14, further comprising one or more of:

enabling a user to verify the structure associated with the dataset and to revise the structure associated with the dataset to facilitate generation by the AI model of queries for answering natural language questions based on the structure associated with the dataset;

enabling the user to reply to one or more questions received from the AI model related to the structure associated with the dataset to facilitate generation by the AI model of queries for answering natural language questions based on the structure associated with the dataset; and enabling the user to provide natural language statements associated with the dataset to facilitate generation by the AI model of queries for answering natural language questions based on the structure associated with the dataset.

16. The method of claim 14, further comprising validating the query received from the AI model, wherein validating the query includes one or more of:

determining whether the query is sanitized;

determining whether the query is able to be successfully executed against the data in the dataset; and determining whether a set of data retrieved by the execution of the query against the data in the dataset is accurately responsive to the natural language question.

17. The method of claim 14, wherein the one or more structural characteristics of the data responsive to the natural language question include:

one or more dimension associated with the data responsive to the natural language question; and one or more measure associated with the data responsive to the natural language question.

18. The method of claim 14, further comprising:

receiving, from a user, a request to modify the graphical visualization of the data responsive to the natural language question;

enabling the user to modify the graphical visualization of the data responsive to the natural language question; and displaying the modified graphical visualization.

19. The system of claim 18, wherein the modification of the graphical visualization of the data responsive to the natural language question includes one or more of:

modification of the graphical visualization from a first type of graphical visualization to a second type of graphical visualization; and modification of one or more labels associated with the graphical visualization of the data responsive to the natural language question.

20. A computer-based tool for managing blocking operations of components in a train yard, the computer-based tool including non-transitory computer readable media having stored thereon computer code which, when executed by a processor, causes a computing device to perform operations comprising:

identifying a structure associated with a dataset;

receiving a natural language question related to data in the dataset;

providing the structure associated with the dataset and the natural language question to an AI model to receive, from the AI model, data responsive to the natural language question;

analyzing the data responsive to the natural language question to determine one or more structural characteristics of the data responsive to the natural language question; and generating a graphical visualization of the data responsive to the natural language question based on the one or more structural characteristics of the responsive data.

* * * * *